Oct. 30, 1951      J. D. RIESER      2,573,493
VARIABLE SPEED DRIVE
Filed April 28, 1945      11 Sheets-Sheet 3
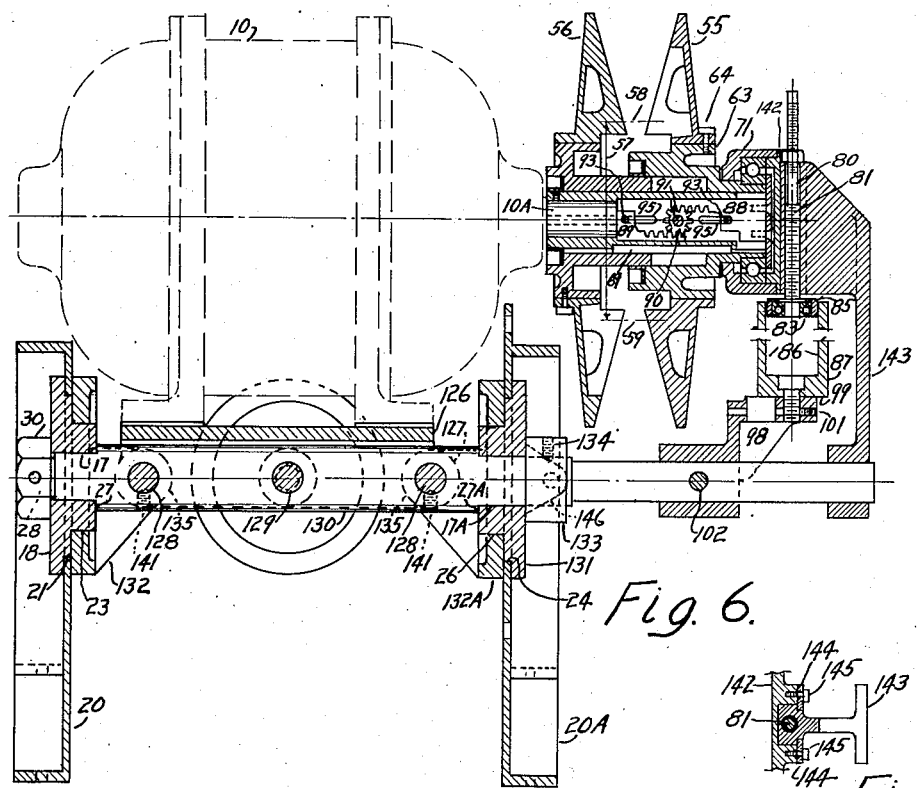
Fig. 6.
Fig. 6A.
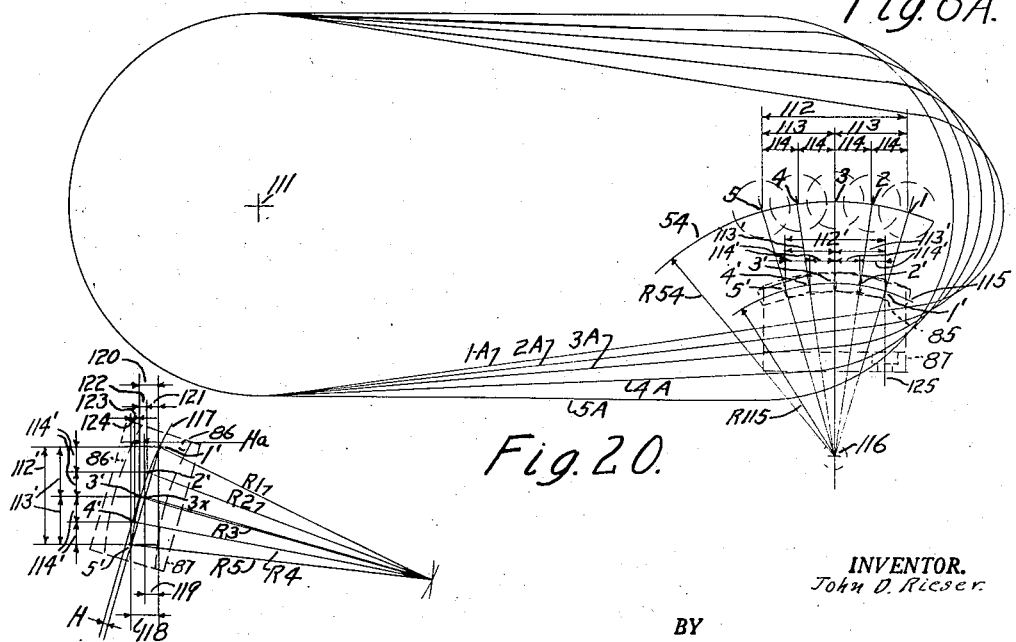
Fig. 20.
Fig. 21.
INVENTOR.
John D. Rieser.
BY Oct. 30, 1951  J. D. RIESER  2,573,493
VARIABLE SPEED DRIVE
Filed April 28, 1945  11 Sheets-Sheet 4

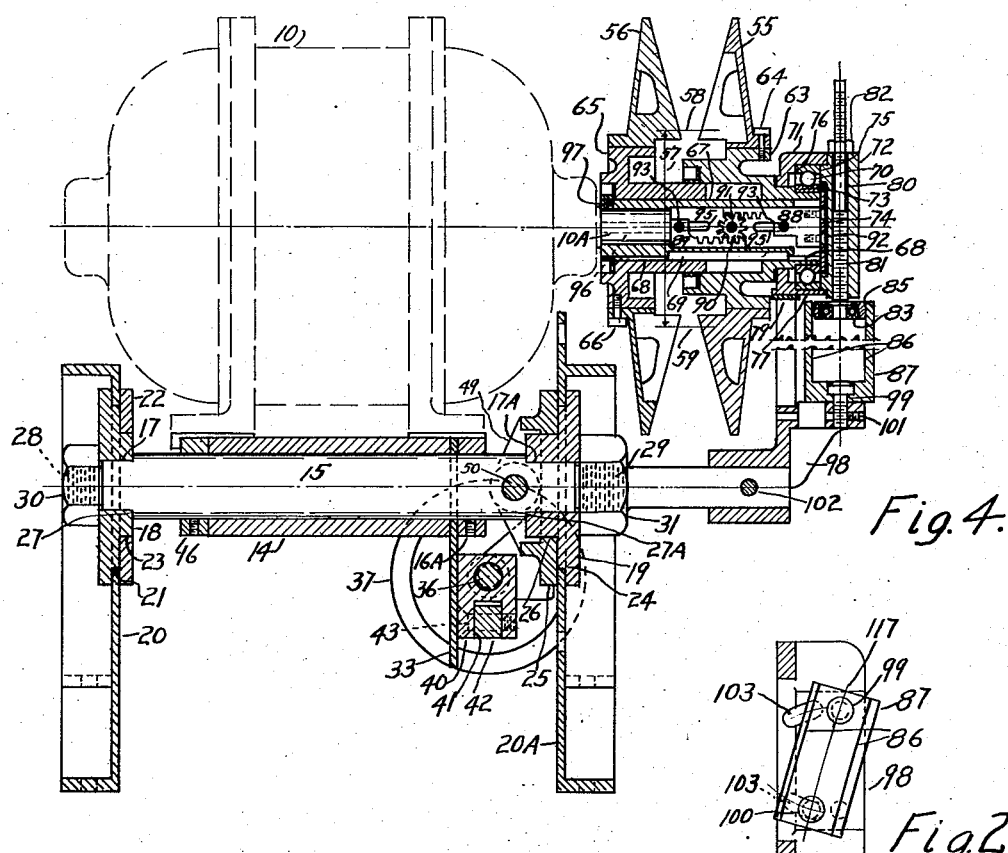

INVENTOR.
John D. Rieser.
BY

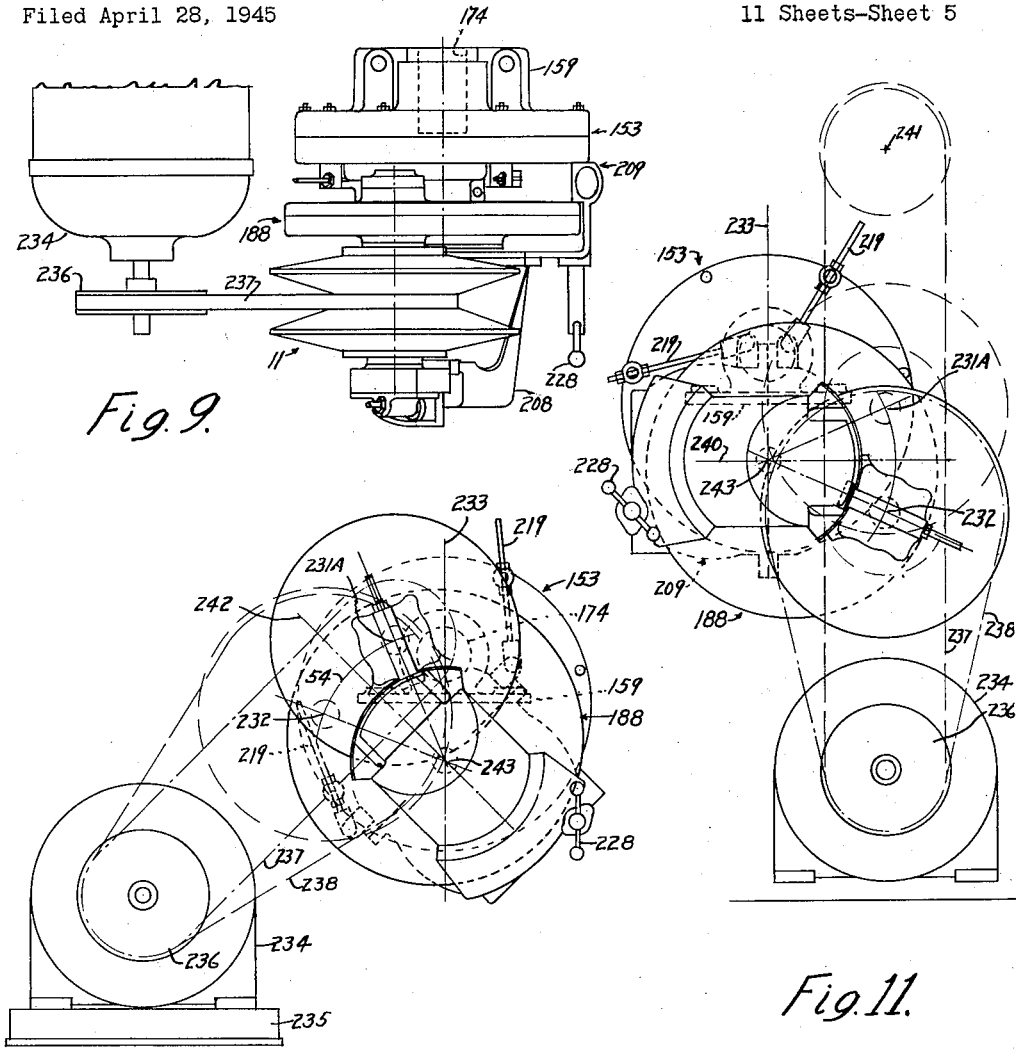

Oct. 30, 1951  J. D. RIESER  2,573,493
VARIABLE SPEED DRIVE
Filed April 28, 1945  11 Sheets-Sheet 6

INVENTOR.
John D. Rieser.

BY

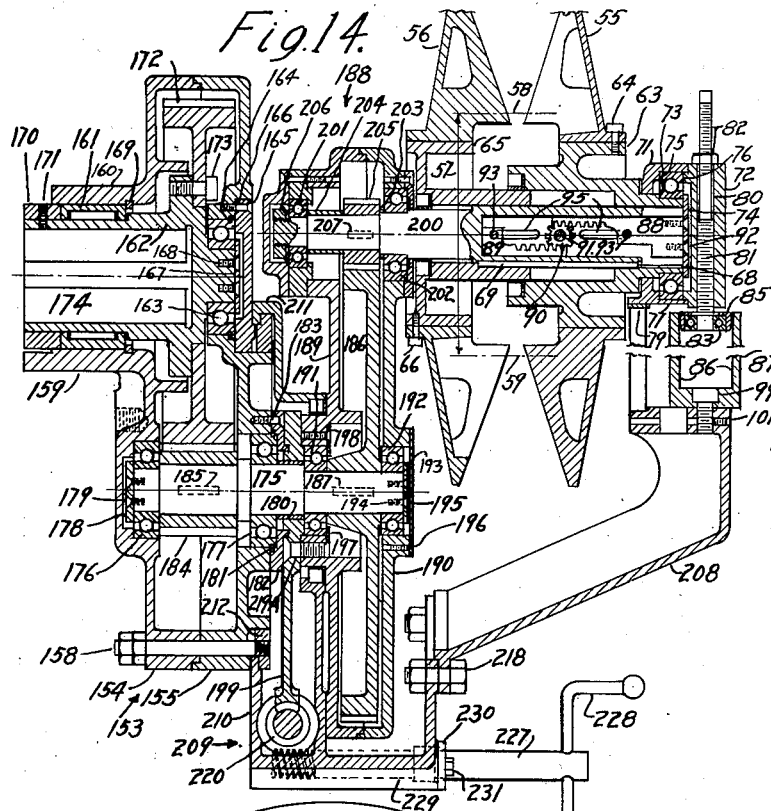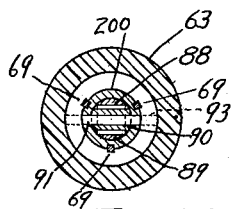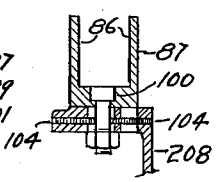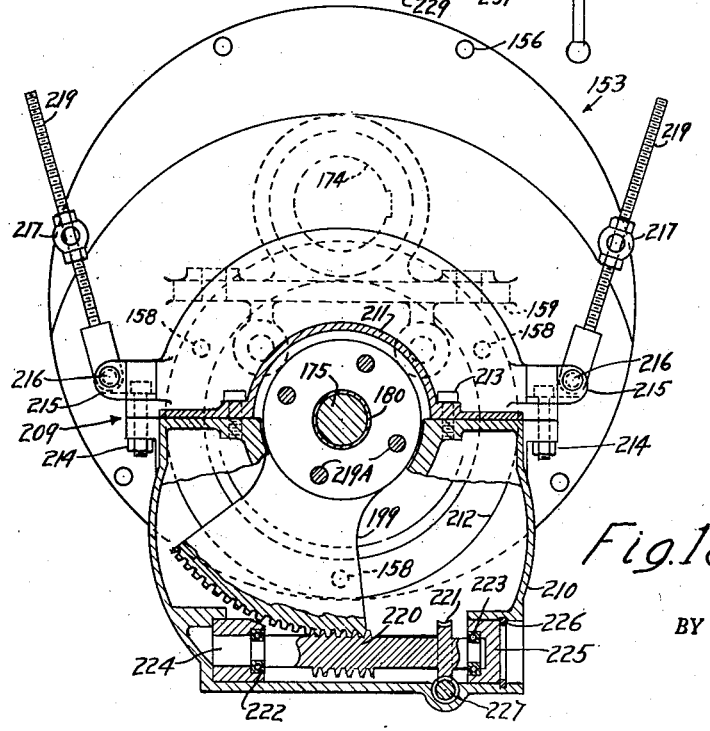

Oct. 30, 1951 J. D. RIESER 2,573,493
VARIABLE SPEED DRIVE
Filed April 28, 1945 11 Sheets-Sheet 8
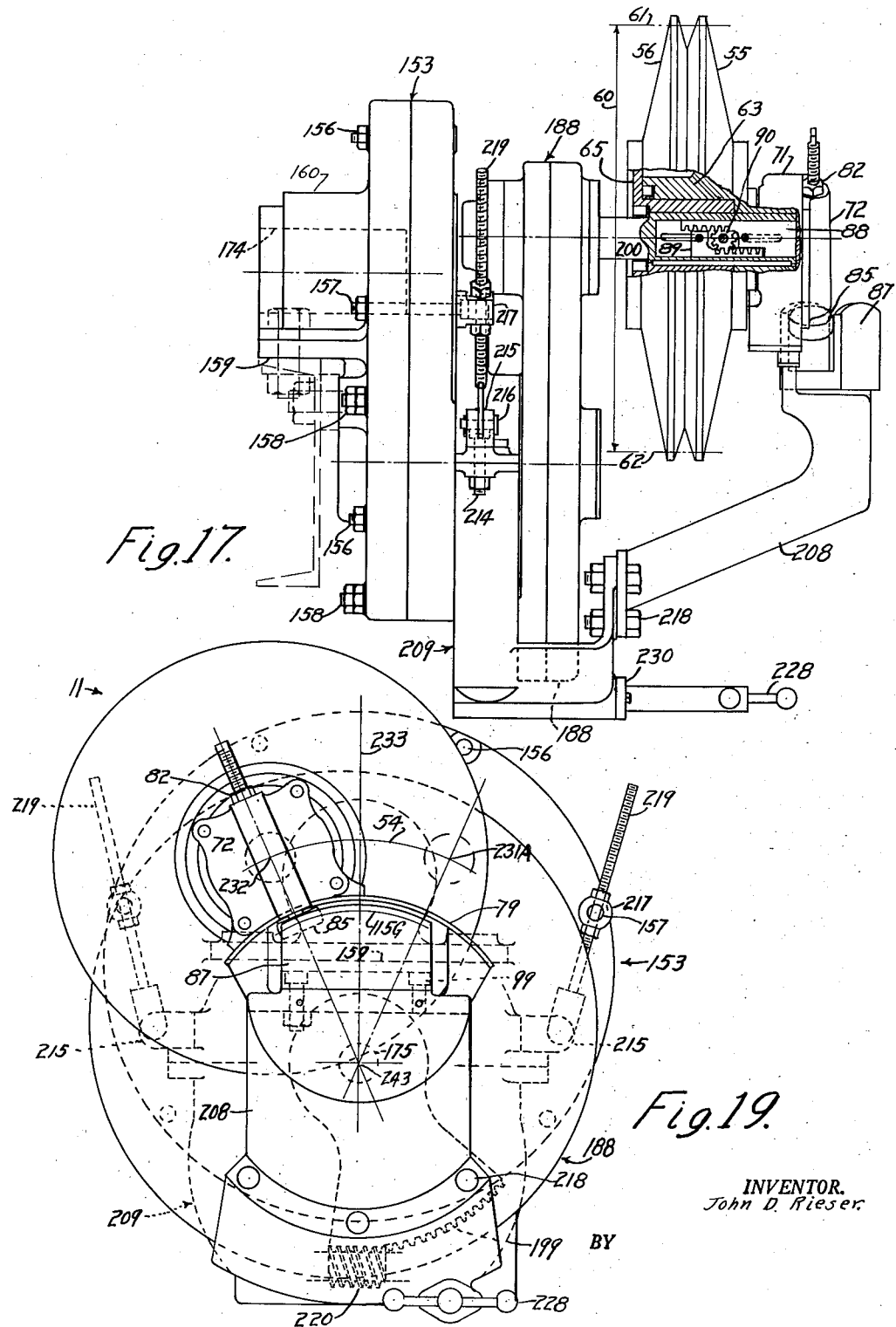
INVENTOR.
John D. Rieser Oct. 30, 1951      J. D. RIESER      2,573,493

VARIABLE SPEED DRIVE

Filed April 28, 1945      11 Sheets-Sheet 9

INVENTOR.
John D. Rieser.

BY

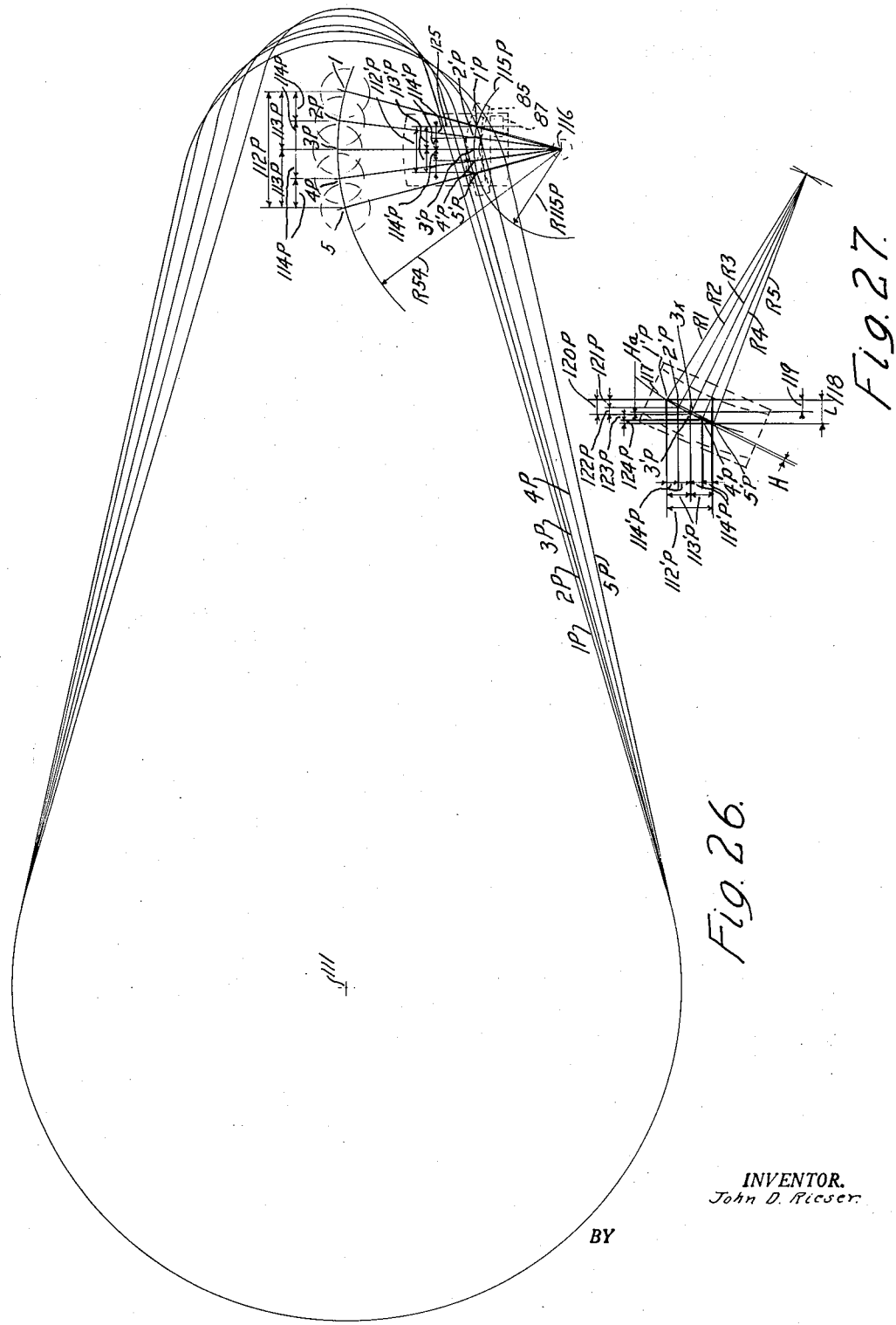

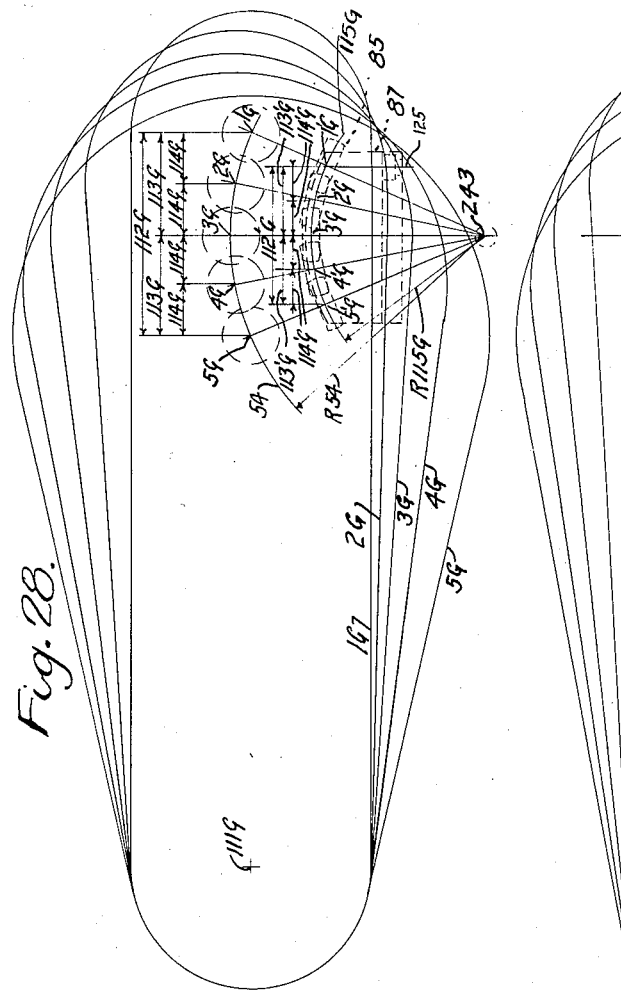
Fig. 28.
Fig. 29.
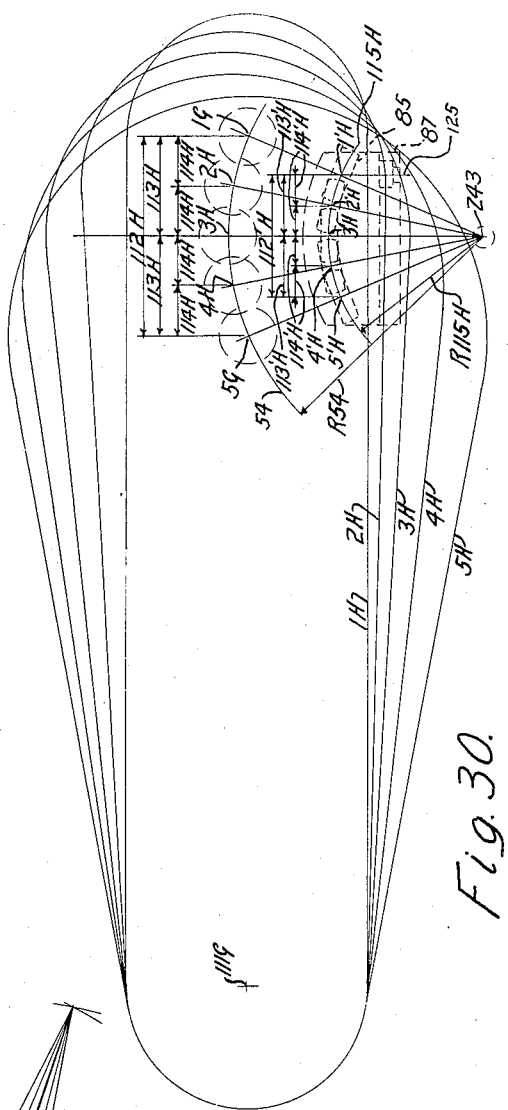
Fig. 30.
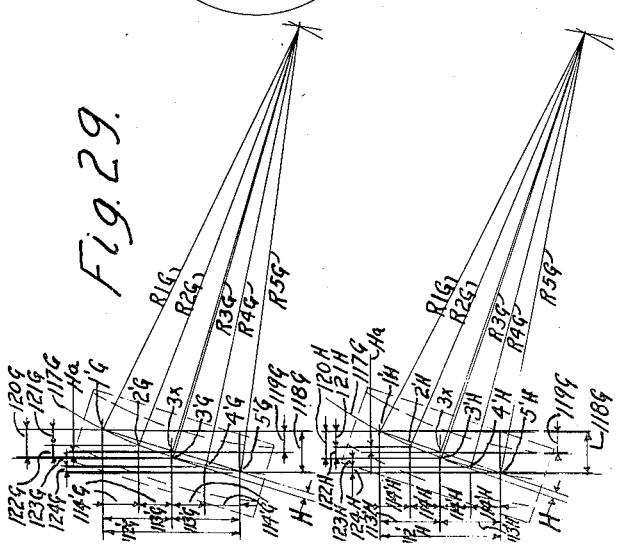
Fig. 31.
INVENTOR.
John D. Rieser.
BY

Patented Oct. 30, 1951

2,573,493

UNITED STATES PATENT OFFICE 2,573,493

VARIABLE-SPEED DRIVE

John D. Rieser, San Francisco, Calif.

Application April 28, 1945, Serial No. 590,749

18 Claims. (Cl. 74—230.17)

1

This invention relates to the variable speed transmission art, and more particularly to a V belt variable speed transmission employing a pair of pulleys, mounted for rotation in parallel relationship, and an endless V belt trained about their effective diameters to transmit power from one to the other, at least one of the pulleys being controllably moveable with respect to the other to effect a change in the distance between the two pulleys and one of the pulleys having its effective diameter adjustable to change the drive ratio between the two pulleys.

In a variable speed device of the character described, it is well known that a change in the effective diameter of the adjustable diameter pulley requires a correlated change in the center distance between the axis of the two pulleys. The rate of movement between (1) the axial movement changing the effective diameter of the adjustable pulley, and (2) the related simultaneous transverse movement effecting a change in the center distance between the aligned pulleys is not a constant ratio if one maintains a constant belt path length throughout the range of speed adjustment when effecting a change in transmission speed. The transverse movement of the adjustable pulley is in a direction perpendicular to the axis of the adjustable pulley, and the axial movement is in a direction parallel to axis of the adjustable pulley. The correlation of these two movements fall on a curved path, when viewed in plan, and the ratio between the two movements continually varies over the speed adjustment range, being least when the center of the two pulleys are spaced apart the maximum permissible distance, gradually increasing as the centers of the two pulleys approach each other, to maintain a condition of constant belt path length about and between effective diameters of the pulleys throughout range of speed adjustments. Heretofore this has been accomplished in a compromised manner that fails to maintain the correct varying ratio between the two correlated movements and to maintain a condition of a constant belt path length about the effective diameters and between the pulleys throughout range of speed adjustment.

In a given drive wherein a belt or the like is used to transmit motion from one pulley to another pulley, the length of the belt will increase as the belt stretches; it is also desirable to have means for applying belts of different lengths; a change of belt length, changes the distance of transverse movement from one extreme to other extreme position and at intermediate positions. Also the presently defined distance H changes, but not in proportion. This change in the distance of transverse movement in some applications increases and the H distance decreases, and in other applications the distance of transverse movement decreases and the H distance also decreases, but not of same proportion, when a longer belt is applied; the range of the adjustable pulley effective diameters, and a con-

2 dition of a constant belt path being maintained throughout range of the speed change. And a similar condition applies when a greater presently defined initial ratio of a drive from that on which a given adjustable pulley system had been developed is desired.

In an adjustable pulley structure, the distance of axial movement of the pulley sections relative to each other is governed by the angle of the sides thereof forming the V groove for the V belt. For instance, should the included angle between the sides of the V groove be of less angle, the distance of axial movement between given effective diameters of the adjustable pulley would be less than were a greater angle applied. And having determined this angle and the effective diameter range for a given adjustable pulley, the distance of axial movement is computed and is a fixed quantity.

One of the objects of this invention is to provide a variable speed transmission device of the V belt type having an adjustable effective diameter pulley formed by cooperating pair of pulley sections having faces thereof beveled to provide V groove for a belt, means being provided to move (1) axially relative to each other a cooperating pair of pulley sections to vary the effective diameter of the adjustable pulley, the axial movement of the pulley half being in a direction parallel to axis of rotation, and, simultaneously (2), to vary the center distance between the adjustable diameter pulley and a fixed diameter pulley, the controlled transverse movement and the axial movement being correlated to provide proper relationship between the two movements to maintain a condition of a constant belt path length about and between the effective diameters of the two pulleys throughout range of speed adjustment.

Another object of this invention is to provide adjustable means for controlling the transverse movement in such a manner so as to maintain the adjustable pulley effective diameter range, (1) when applying belts of different length from that on which a given adjustable pulley system had been developed in a drive of the character described, and (2) the adjustability of the means controlling the transverse movement be similarly utilized when change in the initial ratio of a drive is desired, a condition of a constant belt path length being maintained throughout the range of the speed adjustment.

Another object of this invention is to provide for takeup of change in belt condition due to stretch of the belt in service without resorting to upsetting the connection between an adjustable pulley device base and the foundation.

Another object of this invention is to provide for in a transmission of the character described, having a common base and other portion of the structure for anchorage to a fixed foundation, to form a fixed portion, and an operable portion including a pulley joined to the fixed portion in manner to allow for rotation thereabout to change the position of the pulley over a curved path to a selected position thereof, to conform with location of the other pulley, independently of the base plane; or the base can be mounted on a foundation in any plane desired independently of the operable portion. Thus I provide a system of adjustment to allow for the driver being located about a driven member in a selected position most convenient for its support.

Another object of this invention is to provide for the adjustable pulley structure being mounted about its shaft and a part of or attached to this shaft is a rotatable member in mesh with another rotatable member that is in turn rotatable about another center, the adjustable pulley structure being pivoted and operable about the other center by positive means in a manner to compensate for turning movement encountered when power is being transmitted through the interconnecting members.

Another object of this invention is to provide for in a transmission of the character described, wherein the center of both pulleys may change positions during course of speed adjustment, one by actuated means and other by independent pivoted means, such as an ordinary tension control base, and when so applying a variable speed combination, the correlated movements may be of a curved path hereinafter described, or otherwise, and yet maintain a condition of substantially constant belt-path length throughout entire range of speed adjustment.

Another object of this invention is to provide for positive control for both the transverse movement and the axial movement, the control means utilized for this being supported by a pivotally supported structure, the pivot being the center (1) about which the adjustable pulley travels over an arc when effecting transverse movement and (2) about which the pivotally supported structure is movable so that a desired transverse movement range may be adjusted to coincide with a desired axial movement range of the control member.

For reasons of brevity, applicant has shown one form. While other conventional forms could be utilized such as one of a pair of pulley sections of the adjustable effective diameter pulley being mounted in a fixed position axially while providing means for moving the cooperating pulley section a greater axial distance to produce a like change in the effective diameter of the variable effective diameter pulley or, in place of using standard, narrow type V belts to transmit the power from one pulley to the other pulley with its telescoping type pulley sections at the adjustable pulley, similar to that described in my Patent No. 2,183,267, pertaining to variable speed transmission device where both shaft centers having pulley structures mounted thereof in fixed positions relative to one another, wide section belts may be substituted in place of narrow section belt and the sloping face of the pulley sections altered to accommodate same, or other means for actuating the adjustable effective diameter pulley can be used in conjunction with the change of center distance between the two aligned pulley structures of which one is of the fixed effective diameter and the other of the variable effective diameter type, one of the pulleys being mounted for pivotal movement about the center of rotation of a driven member to provide means for moving the pivotally mounted pulley through an arc when effecting speed change, or applying a multiplicity of belts in a system, all without departure from the nature and principle of this invention.

This invention possesses other advantages and has other objects which may be made more easily apparent from a consideration of several embodiments of the invention. For this purpose there are shown several forms in the drawings accompanying and forming a part of the present specifications. These forms will now be described in detail to illustrate the general principles of the invention, but it is to be understood that this detailed description is not to be taken in a limiting sense as the same are susceptible of modification without departing from the spirit or scope of the invention which is broadly set forth in the following claims.

Figure 2 is a sectional plan view of a control member, in an adjusted position and fastened to a bracket.

Figure 3 is an end view of the same drive shown in Figure 1 with the exception that the system is adjusted to accommodate the different drive angularity; it is a vertical drive arrangement. The base position of the device is positioned similarly in both Figures 1 and 3.

Figure 4 is a sectional view in plan along the longitudinal axis of the system, the adjustable pulley being adjusted to its minimum effective diameter as in Figure 1, but turned into true plan position, the member 87 is therefore shown in broken lines; the motor, being of standard equipment, is shown in dash lines.

Figure 6 is a sectional view similar to that of Figure 4 with the exception that this illustration is of a device whereof transverse movement of the adjustable pulley is along a straight line while that of the other illustrations actuate along an arc.

Figure 6A is a sectional plan to show the sliding connection between cap and roller bracket of the device shown in Figure 6.

Figure 9 is a plan view of the drive shown in Figure 10 with the motor frame partly broken away and the motor base omitted.

Figure 10 is an end view of an adjustable speed drive, gear type.

Figure 11 is an end view of the same drive shown in the Figure 10 with the exception that the system is adjusted to accommodate the different angularity of drive and is a vertical drive arrangement, the base position of the device being similar in both Figures 10 and 11.

Figure 14 is a sectional view in plan along the longitudinal axis of the system, the adjustable pulley structure and the system mounted on its pivot in Figure 12 but turned into a true plan position, the member 87 is therefore shown in broken lines.

Figure 15 is a detailed section view of the adjustable connection between the control member and the bracket.

Figure 16 is a detailed sectional view through the hub and shaft to show the gear connection employed in Figures 4, 6 and 14.

Figure 17 is a side view of Figure 14 but with the adjustable pulley adjusted to maximum effective diameter, a portion being broken away to show the position of the racks with respect to their mated gear wheel; in dash lines, I have indicated the base as fastened to a support structure or foundation.

Figure 18 is a sectional end view to show adjustment means, and the base being shown in dotted lines.

Figure 19 is an end view taken on the pulley side of Figure 14 or 17, the base and other parts are shown in doted lines.

Figure 20 is a side view diagram of a drive similar to that shown in Figure 1, and employing the adjustable pulley and system shown in Figure 4.

Figure 21 is a plan view diagram of Figure 20 showing the proportionment of the transverse movement and the correlated axial movement effected on an arc over the range between minimum and maximum effective diameter of the adjustable pulley, while a condition of a constant belt path length is maintained throughout the range.

Figure 22 is a side view diagram of a drive the same as shown in the Figure 20 with the exception of applying a belt of greater pitch length.

Figure 23 is a plan view diagram of Figure 22 similar to that of Figure 21.

Figure 26 is a side view diagram of a drive same as shown in the Figure 24 with the exception of applying a belt of greater pitch length.

Figure 27 is a plan view diagram of Figure 26 similar to that of Figure 21.

Figure 28 is a side view diagram of a drive similar to that of Figure 10 and employing the adjustable pulley and system shown in Figure 14.

Figure 29 is a plan view diagram of Figure 28 showing the proportionment of the transverse movement and the correlated axial movement effected on an arc over the range between minimum and maximum effective diameter of the adjustable pulley while a condition of a constant belt path length is maintained throughout the range.

Figure 30 is a side view diagram of a drive the same as shown in Figure 28 with the exception of applying a belt of greater pitch length.

Figure 31 is a plan view diagram of Figure 30 similar to Figure 29.

Figure 1:
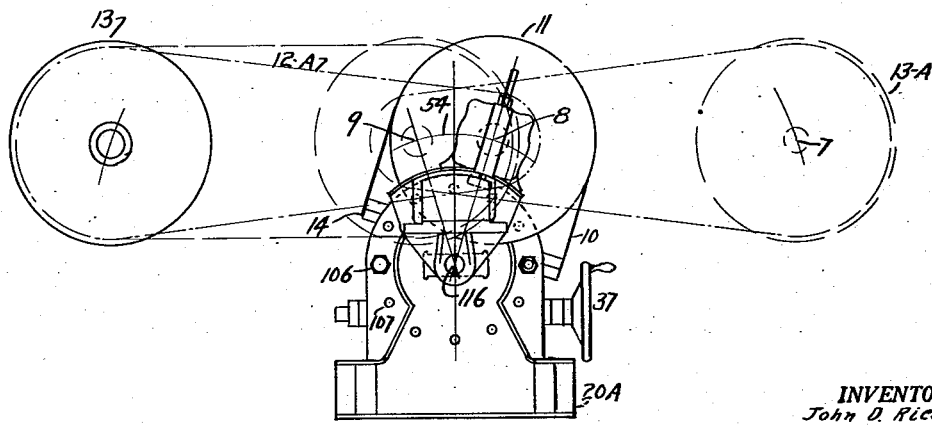
Figure 1 is an end view of an adjustable speed drive horizontally arranged.

Referring to Figure 1, in a variable speed drive arrangement, the adjustable pulley 11 is mounted on the shaft projection of motor 10, and the motor together with portion of the system is pivotally mounted at 116 on the stationary base halves 20 and 20A (hereinafter described). The base halves are assumed as fixed to a foundation (not shown) to provide a fixed anchorage. In alignment with the adjustable pulley is the fixed effective diameter pulley 13, mounted on a shaft (not shown) to be driven at variable speeds. Connection between the pulleys 13 and 11 is by endless V belt 12 not shown. The adjustable pulley is shown as adjusted to minimum effective diameter position. 12A is the pitch line of belt 12. The minimum speed adjustment is with the adjustable pulley adjusted to its minimum effective diameter and the maximum speed adjustment is with the adjustable pulley adjusted to its maximum diameter; the position of the center of the adjustable pulley adjusted to its minimum effective diameter is indicated at 8, and the position 9 is location of same when adjusted to maximum effective diameter. In the Figure 1 is indicated in dash lines the position of the adjustable pulley adjusted to maximum effective diameter position. When effecting speed adjustment, transverse movement is effected on the arc of travel 54, scribed about the pivot position 116, the center of the pulley 13 remaining in a fixed position. In the device described, means are provided for assembling the drive opposite hand, and in such event the drive would be directed as indicated by the dash lines 13A in which the center for the pulley 13 would be the position 7 and the positions 8 and 9 are obviously reversed.

Referring to Figure 3, this shows an end view of the drive of Figure 1, with an adjustment effected in the system (hereinafter described) to position the adjustable pulley system to accommodate the changed angularity of drive and which may be located in other positions scribed about the center 116, the position of the base portion shown in Figures 1 and 3 is the same, although the base may be mounted in other desired positions.

Referring to Figure 4, motor 10 is rigidly fastened in regular manner (not shown) to pivot bracket 14, the pivot bracket 14 having a hub bored for mounting on to spacer shaft 15; set collars 16 and 16A, locate in endwise direction the pivot bracket and the motor. The spacer shaft is provided with milled surfaces 17 and 17A, to match slots in the end plates 18 and 19 (shown in end view, Figure 5). The end plate 18 is turned to match bores in the base half 20 at 21, and the clamp plate 22, at 23. At the opposite side, the end plate 19 is turned to match a bore in the base half 20A at 24, and the operating screw bracket 25, at 26. The milled surfaces 17 and 17A, on the spacer shaft provide the spacer faces 27 and 27A, for spacing of the base halves and the side plates. The spacer shaft has threaded portions 28 and 29, to match nuts 30 and 31. The end plate 19 and the operating bracket are provided for screws 32, to attach same together and clamp therebetween the base half web. The arrangement at opposite base half is provided with similar screws for fastening together of the end plate 18 and the clamp ring, while clamping therebetween the base half web. The end plates entering the bores in the base halves from opposite directions together with the spacing shoulders 27 and 27A, and the nuts 30 and 31, on the spacer shaft form a rigid structure with endwise spacing and clamping of the base halves.

Figure 5:
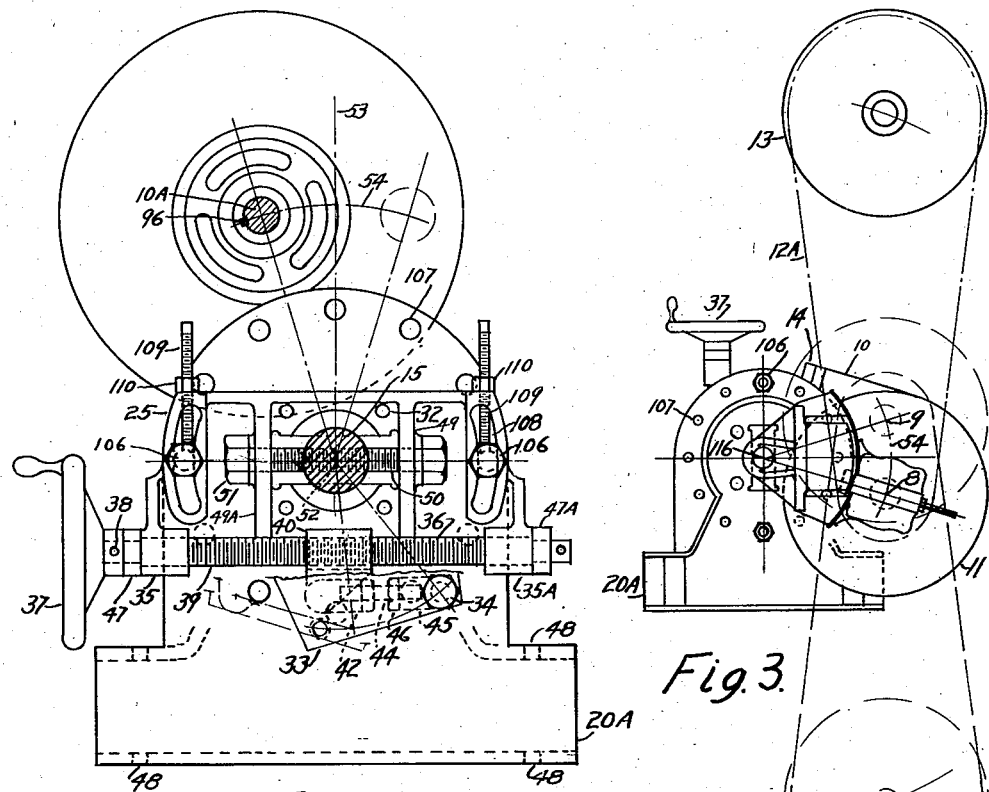
Figure 5 is an end section of Figure 4 to show the adjustment means.

To the side of motor pivot bracket is rigidly attached swing plate 33, shown in elevation in Figure 5, the upper portion being broken away (fastening of this swing plate to pivot bracket not shown). To the swing plate is fastened stud 34, having a shoulder, the stud being screwed into tapped righthand hole shown in Figure 5, for righthand assembly of unit as shown; for opposite hand assembly of unit the stud is assembled in the tapped hole at left hand side.

As a part of the operating screw bracket 25 there are two operating screw bearing lugs 35 and 35A, whereof the operating screw 36 rotates upon actuation of the handwheel 37, which is fastened to the operating screw by means of pins 38. The operating screw 36 has threads 39 over a portion of its length on which travels in a longitudinal direction, the nut 40, threaded to match threads 39. The nut has a milled space 41, Figure 4, to receive a rod end 42, which is pivotally attached to the nut by screw 43. The rod end is tapped to receive the threaded rod 44, at one end and at other end of this rod, which is also threaded, is another rod end 45, tapped to receive the rod, the two rod ends and the rod forming a link assembly of adjustable length. Threaded on to rod 44 is a lock nut, 46. The rod end 45 is bored to pass over the shouldered stud 34 forming a pivot connection between the two. Bearing against opposite faces of the operating screw bearing lugs are the set collars 47 and 47A, which are in turn fastened to the operating screw (fastening not shown) to prevent endwise movement of the operating screw.

In operation, upon actuation of the handwheel 37, rotation of the operating screw 36 is caused and, as the nut is prevented from rotating with the screw by face of the swing plate and the link assembly, the nut moves in a longitudinal direction on the operating screw; thus the pivot attachment described causes rotation through an arc of the motor pivot base, the center of the spacer shaft being a point of fulcrum as a unit for the parts 16 to 33 and the motor with the adjustable pulley structure mounted thereon. In the base halves 20 and 20A, the holes 48 are the foundation bolt holes for fastening the device on to a fixed foundation or footing. On bracket 19 are ribs 49 and 49A, with bosses thereon. The bosses and ribs are bored and faced for takeup bolt 50, which is threaded for nut 51, the nut being anchored to the takeup bolt. The takeup bolt is locked in endwise direction by inside faces of the bolt head and nut bearing against faces of the bosses. The spacer shaft is threaded to match takeup bolt in aligned position with bearing holes for the takeup bolt at 52.

Assuming that device has been erected and aligned upon a fixed foundation for operation and an adjustment relative to the center distance between the two pulleys connected by belt is found necessary, the nuts 30 and 31 are slightly loosened, then actuation of the takeup bolt causes movement in a direction desired of the spacer shaft in the slots of the end plates 18 and 19 together with that portion of the structure mounted on the spacer shaft.

For illustration, assume a condition of the spacer shaft being centrally located as shown in Figure 5, the adjustable pulley being mounted on the motor shaft positioned as shown to the left of the vertical center line 53, and it being desired to adjust the spacer shaft to the left of the vertical center line 53, the operating screw 36 and its nut remaining stationary, a movement of spacer shaft from its assumed location to a new location, as specified, would cause a movement through an arc of the center of the shouldered stud 34 in an upward vertical direction being pivoted about the screw 43. This in turn causes the pivot bracket 14 and the attached motor to rotate through an arc centered about the spacer shaft which in turn causes the center of the motor to travel on the arc of travel 54, with the adjustable pulley to move towards the left of its present position. However, this movement of the adjustable pulley does not upset the adjustable pulley structure for, upon actuation of the operating screw, the adjustable pulley structure and control means fulfills all of the conditions hereinafter described. Nor does this adjustment of the takeup means upset the setting or alignment of the device upon its foundation; the only change that takes place, aside from the change in center distance, after having applied the takeup means, is that the nut 40 operates upon a different portion of the operating screw. And further, considering the above illustration, should the handwheel be actuated in direction to rotate the operating screw in a correlated direction to compensate for movement of the spacer shaft position while the takeup bolt is being actuated, there would then be no movement through an arc of the adjustable pulley. Its movement then would be in a straight line parallel to the movement of the spacer shaft and of like magnitude.

The outline of electric motor 10 in the drawings is an approximate outline of a standard type motor, the shaft extension 10A, Figure 4, whereof is mounted the adjustable effective diameter pulley, the motor shaft being supported in regular manner for rotation and fixed against endwise movement. The adjustable effective diameter pulley includes the pulley sections 55 and 56 having opposed sloping faces thereof to form V groove for seat of the V belt (the belt not shown in Figure 4). The pulley sections are arranged to be adjusted relative to one another to effect infinite variation of the effective pulley diameters from minimum to maximum effective diameter range. The arrowed line 57 from pitch line 58 to line 59, represents the minimum effective diameter, while the arrowed line 60, from belt pitch line 61 to line 62, represents the maximum effective diameter of an adjustable effective diameter pulley, Figure 17. The pulley section 55 is mounted on the hub 63, and rigidly joined thereto by the screws 64. The pulley section 56 is mounted on the hub 65 and rigidly joined thereto by screws 66. The hub 63 is bored for a sliding fit on the hub 65 and the hollow sleeve shaft 67, and the hub 65 is bored for a sliding fit on the hollow sleeve shaft. Both hubs have keyways 68, aligned to coincide with common feather keys 69, to provide for rotation of the hub assemblies with their respective pulley sections, and whereby the hollow sleeve shaft and hubs 63 and 65 revolve as a unit, while the hub bores and the keyways allow for axial movement. On a section of the hub 63 is located the inner race of ball bearing 70; the outer race of this bearing is located in the housing 71 and cap 72. The cap is rigidly fastened to the housing by screws (not shown) and the ball bearing is located against endwise movement on the hub section by the shoulder 73 and the keeper plate 74, endwise movement of the ball bearing within the housing being prevented by the shoulders 75 and 76. The portion of the housing 71 shown in contact at portion of the hub 63 is machined to allow for rotation of the hub within the housing, and housing assembly being prevented from rotation by the face 77, of housing in contact with the arc plate 79. The cap 72 is provided with threaded hole 80 to receive threaded rod 81, having an upper portion provided with a lock nut 82 to lock the rod in an adjusted position. The lower section of rod 81 is provided with ball bearing 83 of which the inner race is fitted to the rod end and the outer race is engaged along the inner diameter of a spherical roller 85. The roller is in rolling contact with guide faces 86 of the adjustable member 87. The threaded connection between the rod 81 and cap 72 allows for adjustment in a radial direction towards or away from the spacer shaft (this adjustment being hereinafter described).

The hollow sleeve shaft (for an end section see Figure 16), has located in sliding contact two racks 88 and 89, both these racks have gear teeth thereon in contact with a gear wheel 90; the gear wheel has teeth to match the racks and is journaled on the pin 91. The pin 91 is rigidly fixed to the side walls of the hollow sleeve shaft to locate the gear wheel in fixed rotative position; the rack 88 is attached to the keeper by screws 92. Through the body of the rack 88 and 89 are the pins 93, these pins engaging the surface of the hole through the bodies of the racks and being extended through the side walls of the hollow sleeve shaft. The slots 95 in the side walls of the hollow sleeve shaft at both places allow for passing therethrough of the pins. At the rack 88, the hub 63 of the pulley section 55 is provided with an aligned hole passing through a section of this hub to engage ends of the pin 93. Thus rack 88 becomes a fixed part of this pulley section, while on the rack 89, hub 65 of the pulley section 56 is provided with a similar aligned hole passing through a section of this hub to engage ends of the pin 93 so the rack 89 becomes a fixed part of this pulley section. One of these pins shown in the Figure 16, in dotted lines.

A portion of the hollow sleeve shaft is bored to fit on to motor shaft end (Figure 4). This portion of hollow sleeve shaft is provided to receive the driving key 96 (shown in dotted lines). The setscrew 97 is to prevent endwise movement of the hollow sleeve shaft upon the motor shaft end.

The adjustment member 87 has inner faces 86 thereof for rolling contact with the roller 85 (Figure 4). This adjustment member 87 is fixed to the bracket 98 in an adjusted position by the capscrew 99 shown screwed into the bracket. In turn, this capscrew is locked by the setscrew 101. The capscrew 99 also serves as a pivot for adjustment of the adjustment member 87, hereinafter described. Towards other end of the adjustment member is located bolt 100, clamping the adjustment member in fixed adjusted position to the bracket (see Figure 15, and for plan view, Figure 2). In the bracket 98 are located slotted holes 103, one of which the bolt 100 passes through; the other slotted hole is used when assembling the opposite hand drive. There are also two tapped holes to receive the capscrew. In a direction perpendicular to the axis of the bolt, there are two setscrews 104 screwed into the bracket. The end of each setscrew bears against the bolt from opposite directions for adjusting the position of the bolt 100 within the slot 103 as well as locking the same in an adjusted position. The bracket is fitted on an extension of the spacer shaft and is keyed thereto to prevent rotative or endwise movement about the spacer shaft by the pin 102. Thus the bracket becomes a fixed part of the spacer shaft. The curved plate 79 is fastened on to arms of the bracket 98 by screws (not shown) in a fixed position thereon.

The face of the adjustment member 87 is derived from the center path 117 (Figure 2) of the roller 85 and its curvature is substantially equal to the radius of the roller from the center path. The center path is of a form whereby the transverse movement distance, when effecting adjustment of the adjustable pulley from minimum to maximum effective diameter, or reversely, the ratio of movements between the transverse movement distance and the axial movement distance constantly varies.

In operation, referring to Figures 4 and 5, the rotation of the handwheel 37 rotates the operating screw 36 which advances or returns the nut 40 thereon and, through the connected linkages, tilts the pivoted bracket 14 and the attached motor 10 with the adjustable pulley structure as a unit about the spacer shaft 15. The spacer shaft remains in a stationary position, being supported at the surfaces 17 and 17A, in matching slots in the end plates 18 and 19 which are in turn anchored in an adjusted position with respect to stationary base member 20 and 20A, and, through the takeup screw connection thereof, the operating screw bracket and the stationary base member 20A. The tilting of the pivoted bracket unit causes the center of the adjustable pulley structure to change position on the arc of travel 54. The change of position of the adjustable pulley structure on the arc of travel 54 is in a transverse direction to the axis of the adjustable pulley structure. The adjustable pulley section 55, together with the parts attached thereto in fixed endwise relationship, when actuated in an axial direction, act as a unit. Also, the adjustable pulley section 56, together with the parts attached thereto in fixed relationship, when actuated in an axial direction, act as a unit. The adjustment member 87 is anchored in an adjusted position on the bracket 98 which is in turn fixed in position on the stationary shaft 15. These remain in a fixed position relative to the adjustable pulley structure arc of travel 54 upon operation of the device. The roller 85 is in rolling contact with the face of the adjustment member 87, thus the transverse movement of the adjustable pulley structure causes axial movement of the adjustable pulley section 55 unit; the rack 88, being a portion of the adjustable pulley section 55 unit, its axial movement causes rotation of the gear wheel 90, mounted rotatably in fixed relationship, and with which the rack gear teeth are in mesh, the gear teeth of the rack 89 being in mesh with gear teeth of the gear wheel on an opposite side, causes the adjustable pulley section unit 56 to move correspondingly but in an opposite direction; the rack 89, being a portion of the adjustable pulley section 56 unit, the axial movement, towards or away from one another, of the adjustable pulley sections, effects a change in the effective diameter of the adjustable pulley.

Referring to Figure 5, the operating screw bracket 25, to which end plate 19 is fastened by the screws 32, is adjustable in rotatable direction relative to the base, together with the spacer shaft 15 and the structure mounted thereon and provides a system whereby the spaced parallel pulley may be positioned irrespective of the base setting. The end base 20A is shown as including bolt holes 107 spaced on a circle. A pair of these are utilized in conjunction with the two curved slotted holes 108 in the operating screw bracket 25 for the bolts 106, to clamp the operating screw bracket to the end base 20A, in an adjusted position. The curved slotted holes 108 are of length approximately equivalent to that of the bolt hole spacings. The operating screw bracket has screwed thereon the setscrews 109, positioned to allow the end of the setscrews to bear upon the body of the bolts 106 as means for locking the adjusted position of the operating screw bracket relative to the base. These two setscrews also serve as means for a final fine adjustment of a desired position of the system; for upon the nuts of the bolts 106 being slightly loosened and the screwing in one direction of one of these setscrews while screwing in an opposite direction of the other setscrew, movement in a rotative direction of the system relative to the base setting is caused. The length of the curved slotted bolt holes 108 or the reach of the setscrews 109 does not limit the range of adjustment of the system, as the system may be rotated the full range of the curved slotted bolt holes coincides with any set of bolt holes on the circle of holes in base. The setscrews 106 are provided with lock nuts 110.

Figures 1 and 3 serve to illustrate the system provided for locating the position of the spaced parallel mounted pulley irrespective of the base setting.

Figure 1 is an end view of a horizontal adjusted drive. Assuming that the base is mounted in horizontal fixed position, the transverse movement of the movable pulley structure is then in a general horizontal direction and the other pulley on a fixed center, also in a horizontal direction. Figure 3 shows a like end view of same drive with the base as above on a horizontal setting, the system, with respect to the base, being adjusted for a vertical drive. The transverse movement of the moveable pulley structure then is in a general vertical direction and the other pulley on a fixed center is positioned vertically to that of the base. The only difference between the two installations is that the handwheel is positioned at a different end of the operating screw. This does not constitute a change of the actuation means. Nor would changing the hand of drive by the means provided entail change of the actuation means.

From the descriptions and drawings it will be readily seen that the system allows ready means whereby the spaced parallel mounted pulley may be positioned in any position independent of the base setting and is not limited to the illustrations herein mentioned.

To illustrate the condition of constantly varying ratio of movements between the transverse movement distances and the correlated axial movement distances, referring to Figures 20 and 21, Figure 20 is side view diagram of the arc of contact of a belt at five equal positions in the transverse movement of the adjustable effective diameter pulley and, at the same division positions, the correlated arc of contacts of belt at the fixed effective diameter pulley. The center of the adjustable pulley changes positions on the arc of travel 54, when effecting a change of the effective diameter while the fixed effective diameter pulley center remains fixed. The lines 1A, 2A, 3A, 4A, and 5A represent pitch line of belt and are all substantially of same length; the curved portion of these lines at the adjustable pulley structure represent the arc of contact of the belt about the adjustable pulley effective diameter; curve of line 1A is scribed from the position 1; the curve of line 2A is scribed from the position 2; the curve of line 3A is scribed from the position 3; the curve of line 4A is scribed from the position 4; and the curve of line 5A is scribed from the position 5. The curved portion of these lines at the fixed effective diameter pulley, is scribed about the center 111, and represents the arc of contact of a belt on the fixed effective diameter pulley. The tangent section of the lines connecting the curved portions in each position represent the straight portion of belt connecting the pulleys, the belt being endless. The pitch lines, all being of substantially same length, fulfill the condition of constant belt path length throughout entire range of the variable effective diameter pulley. The position 1, and the arc of circle scribed about this center representing center of the adjustable pulley with the system adjusted for its minimum effective diameter, and the distance from the position 1 to center 111, represents the center distance between the two parallel mounted pulleys; it also represents the initial ratio of drive when so adjusted. The position 5 and the arc of circle scribed about this center representing the center of the adjustable pulley with system adjusted for its maximum effective diameter, and the distance from position 5 to the center 111 represents the center distance between the two pulleys. When so adjusted, both the adjustable and fixed pulleys have like effective diameters and therefore the center distance between pulleys would be at a minimum.

With the system adjusted to the maximum effective diameter of the adjustable pulley, a specified length increase of the center distance between the two pulleys would necessarily cause less change in the adjustable pulley effective diameter than would a like specified length decrease of the center distance between the two pulleys when the system is adjusted to the minimum effective diameter of the adjustable pulley. As the axial movement distance of the adjustable pulley structure is determined by the difference between any two effective diameters, it is readily seen that the axial movement distance is greater at the lesser effective diameter.

The distance 112, from positions 1 to 5 represents the total transverse movement from minimum to maximum effective diameter of the adjustable pulley, and the distance 113, from the positions 1 to 3 and from 3 to 5, is equal to one-half the distance 112. The position 3 is mid position on the transverse movement. The arc of circle line 3A scribed about this position represents the arc of contact of the belt on the adjusted effective diameter at mid position. And the distance 114 from the positions 1 to 2, 2 to 3, 3 to 4 and 4 to 5, all of like length, complete the five equal division positions of the transverse movement. The arc of circle 2A and 4A, scribed about the positions 2 and 4, represents the arc of contact of the belt on the adjusted effective diameters at these one-quarter and three-quarter positions. Having established the several positions and the minimum and maximum effective diameter of the adjustable pulley, the pitch length of the belt connecting the two pulleys, the intermediate positions effective diameters are readily computed, a condition of constant belt path length being maintained throughout the range of adjustments.

The dotted lines show outline of the control member 87. The roller 85 is also indicated in dotted lines in the five positions about the control member. The center 116 is pivot of the structure, and the spacer shaft 15, whereabout the structure is actuated, the arc of travel 54, and the arc 115 transverse movement of the roller 85. The radial lines from center 116 are scribed to the positions 1, 2, 3, 4, and 5, on the arc of travel 54 to locate the corresponding adjusted positions of the correlated transverse movement and the axial movement at the intersection of the radial lines and the arc 115. Thus the positions 1', 2', 3', 4' and 5' on the arc 115, represent corresponding positions on the arc of travel 54, and the transverse distances 112', 113' and 114' are likewise in proportionment of the transverse distances 112, 113 and 114.

The diagram Figure 21 is a plan view of Figure 20 of the proportioned transverse movement path and correlated axial movement path. The correlated curved path 117 represents the center path of the roller 85. In this diagram, like divisions have like designations. The position 1' is the center of the roller with the effective diameter of the adjustable pulley structure adjusted to the minimum effective diameter. The position 5' is center of the roller with the effective diameter of the adjustable pulley structure adjusted to maximum effective diameter. Therefore the distance 118, from 1' to 5' or reversely, in a direction perpendicular to the transverse movement, represents the axial movement of a pulley section when effecting adjustment from minimum to maximum effective diameters, when applied to structure whereof both pulley sections of a pair are axially moveable. When only one pulley section of a pair is axially moveable, the distance 118 is greater.

In the art, when both pulley sections of a pair are moveable axially equal distances when effecting adjustment, the center of belt remains constant.

Having found the effective diameters of the adjustable pulley to coincide with the transverse movement of the adjustable pulley center on the arc of travel 54, at the five positions enumerated, while maintaining a condition of constant belt path length throughout the entire range and knowing the difference between maximum and minimum effective diameter of the adjustable pulley, and the angle of faces thereof, the distance 118 is readily found. Having determined the proportional position of the arc 115, of roller center travel, connection of the positions 1' and 5', by straight line forms a side of a triangle. Starting at the position 1', a line equal to the length of the proportionment transverse movement parallel to the transverse movement forms another side of the triangle. A line from position 5', perpendicular to the transverse movement distance 118, forms the other side of the triangle. The distance 119, equal to one-half the distance 118, and a line constructed from this point parallel to the transverse movement intersects at position 3x, the line representing one-half the proportionment transverse movement 112'. The distance 120, which represents the axial movement distance from minimum effective diameter position to mid travel 113', or mid effective diameter position, and the difference between distance 120 and 119, equals Ha. Having constructed the triangle and having the distances thereof, the angle is readily computed. Having the angle of the triangle and Ha, the distance H is readily computed. Having H and the related positions 1' and 5', the radius of the curve 117 is determined and is equal to R1, R5 and R3. The distance 121 represents the axial movement of the effective diameters from minimum position 1' to first-quarter position 2', the correlated transverse movement is 114'. The distance 122 represents the axial movement of adjustment of the effective diameters from first-quarter position 2' to mid position 3', the correlated transverse movement is 114'. The distance 123 represents the axial movement of adjustment of the effective diameters from mid position 3' to third-quarter position 4', the correlated transverse movement is 114'. The distance 124 represents the axial movement of adjustment of the effective diameters from third-quarter position 4' to position 5', or maximum effective diameter position, and the correlated transverse movement is 114'. The two correlated movements being in a perpendicular direction to one another, the lines terminating the distances 121, 122, 123 and 124, are constructed parallel to the transverse movement, the lines terminating the equal divisions of the transverse movement 114' are constructed parallel to the axial movement and intersect at the positions 1', 2', 3', 4' and 5' on the curve 117. Throughout the range of adjustment, the correlated movements effected fall on a curved path and the condition of constant belt path length is maintained. The changes in drive ratio are continual.

NOTE.—The transverse movement distance divisions are all alike; the correlated distances, representing the axial movement, vary for each division; the axial movement distances become greater as adjustment is effected away from the one to one ratio of drive position, it being greatest as it approaches the minimum effective diameter position, and that the ratio of movements, between the transverse movement distance to that of the axial movement distance, continually varies. This is obvious as the movements effected fall on a curved path derived about equal divisions represented by the positions 1', 2', 3', 4' and 5'.

If a procedure is provided for dividing the axial movement distance 118 into equal divisions, the intersection positions thus located fall on the curved path 117. The transverse movement divisions thus located are then of varying ratio relative to the other correlated movement divisions. Or if the effective range of the effective diameter of the adjustable pulley are divided into equal divisions, the various distances thus located fall upon the curve 117. If this is done a varying ratio between the movements will be found.

Provision is made to adjust the system to compensate for change of a given belt condition or, for applying a belt of different pitch length or, both a change of belt length, as may be required with a change of the initial ratio of a drive, the maximum and minimum effective diameters of the adjustable pulley structure being substantially unaffected.

To illustrate the application of a belt having a greater length than in the drive diagrammed in Figures 20 and 21, reference is made to Figures 22 and 23. These diagrams are similar to those heretofore described, the division positions and distances having like numerated designations, and only where an adjustment made in the system by the means provided to compensate for the changed belt length applied the suffix L is placed after the numeral. The lines 1–L, 2–L, 3–L, 4–L and 5–L represent the pitch line of the longer belt than that applied in Figure 20. The curved portion represents the arc of contact of the belt with the adjustable pulley effective diameter, curve of line 1–L, scribed from the position 1; and curve of line 2–L scribed from position 2–L; and curve of line 3–L scribed from position 3–L; and curve of line 4–L scribed from position 4–L; and curve of line 5–L scribed from the position 5, and curved portion of these lines at the fixed effective diameter pulley scribed about the center 111; and likewise represent arc of contact of the belt at this pulley effective diameter. The tangent portions of these lines connecting the curved portions, are as heretofore described. The position 1 is the same as heretofore described, the minimum effective diameter of the adjustable pulley and the distance from the position 1 to the center 111 is the center distance between the two pulleys; it is greater than that in Figure 20 and is also the initial ratio of the drive position. The position 5 is the same as heretofore described, the maximum effective diameter of the adjustable pulley position. The distance from position 5 to center 111 is the center distance between the two pulleys. This is greater than that of Figure 20; also at the position 5 both pulley effective diameters are the same. The distance 112–L from position 1 to 5 represents the total transverse movement from minimum to maximum effective diameter of the adjustable pulley and is greater than distance 112 in Figure 20. The distance 113–L, from the position 1 to 3–L and from 3–L to 5, equal to one-half the distance 112–L and the position 3–1 is the mid position of the transverse movement and the arc of circle line 3–L scribed about this position represents arc of contact of the belt of the adjusted effective diameter at mid effective diameter position. The distance 114–L from positions 1 to 2–L, 2–L to 3–L, 3–L to 4–L and 4–L to 5, all of like length, complete the five division positions of the transverse movement. The arc of circle lines 2–L and 4–L scribed about the positions 2–L and 4–L represent arc of contact of the belt at the adjusted effective diameters at these one-quarter and three-quarter positions.

Having established the enumerated positions, the minimum and maximum effective diameters of the adjustable pulley and the pitch length of the belt connecting about the two pulleys, the intermediate position effective diameters are readily computed providing for a constant belt path length throughout the range. It is found that the effective diameter of the adjustable pulley at these intermediate positions are less than at the corresponding intermediate positions established in Figure 20.

The adjusted control member 87 and the roller 85 are shown in dotted lines. The arc of travel 54, the adjusted arc 115–L together with the radial lines from center 116 to positions 1, 2–L, 3–L, 4–L and 5, are scribed from the pivot center 116, same as that heretofore described, and the transverse distances 112'–L, 113'–L and 114'–L are likewise proportional of the transverse distances 112–L, 113–L and 114–L.

The diagram Figure 23 is a plan view of Figure 22, showing the proportioned transverse movement and the correlated axial movement path. The correlated curved path 117 represents the center path of the adjusted roller 85. In this diagram, like divisions have like designations. The position 1'–L is the center of the roller with the effective diameter of the adjustable pulley adjusted to the minimum effective diameter. The position 5'–L is the center of roller with same adjusted to the maximum effective diameter. Therefore, the distance 118, from 1'–L to 5'–L in a direction perpendicular to the transverse movement, represents the axial movement of the pulley section when effecting adjustment from minimum to maximum effective diameters. The distance 118 is unaffected when minimum and maximum effective diameter of the adjustable pulley structure are unaffected.

Having determined the effective diameters of the adjustable pulleys to coincide with the adjusted transverse movement of the adjustable pulley center on the arc of travel 54 at the five positions enumerated, while maintaining the condition of a constant belt path length throughout range to comply with the greater length belt and having determined the adjusted (hereinafter described) proportional position of the arc 115–L, of the roller center travel, connection of the positions 1'–L and 5'–L by a line forms a side of a triangle. From position 1'–L, a line equal to the length and parallel to the transverse movement forms another side of the triangle. A line from position 5'–L perpendicular to the transverse movement distance 118, forms the other side of the triangle. The distance 119, again is equal to one-half the distance 118; a line from this location parallel to the transverse movement intersects at the position 3x; the line representing one-half the proportionment transverse movement 112'–L. The distance 120–L, is less than corresponding division 120 in Figure 21, yet the transverse travel 113–L effecting this distance axial movement is greater than corresponding transverse travel 113 in Figure 20. The difference of the distances 120–L and 119, equals Ha, which is also less than Ha in Figure 21. The distance H is determined as heretofore described. It also is less than H in Figure 21.

Having H and (1) the radius of the curve 117, which is equal to R1, R5 and R3, (2) the proportioned transverse distance 112'–L, with its correlated axial movement distance 118, and (3) the proportionment arc 115–L, the curve 117 is adjusted (hereinafter described) so as to effect the correlated movement, upon actuation of the variable speed system, to provide a condition of substantially constant belt path length throughout entire cycle of speed changes.

The distance 121–L is the axial movement when adjusting the effective diameter from position 1'–L to 2'–L, and is less than corresponding division 121 in Figure 21; the distance 122–L is the axial movement when adjusting the effective diameter from position 2'–L to 3'–L, and is again less than corresponding division 122 in Figure 21; the distance 123–L is the axial movement when adjusting the effective diameter from the position 3'–L to 4'–L, and is greater than corresponding division 123 in Figure 21; and the distance 124–L is the axial movement when adjusting the effective diameter from position 4'–L to 5'–L, and is again greater than corresponding division 124 in Figure 21. The transverse travel 114–L effecting these four distances of axial movement is greater than corresponding distance 114 in Figure 20.

The two correlated movements being in a perpendicular direction to one another, the lines terminating the correlated distances intersect at the positions 1'–L, 2'–L, 3'–L, 4'–L and 5'–L, on the curve 117, as heretofore described, and a condition of constant belt path length is maintained throughout the range of speed adjustment while the ratio between the two movements continually varies. The radii R2 and R4 are substantially equal to radii R1, R3 and R5.

Figures 24, 25:
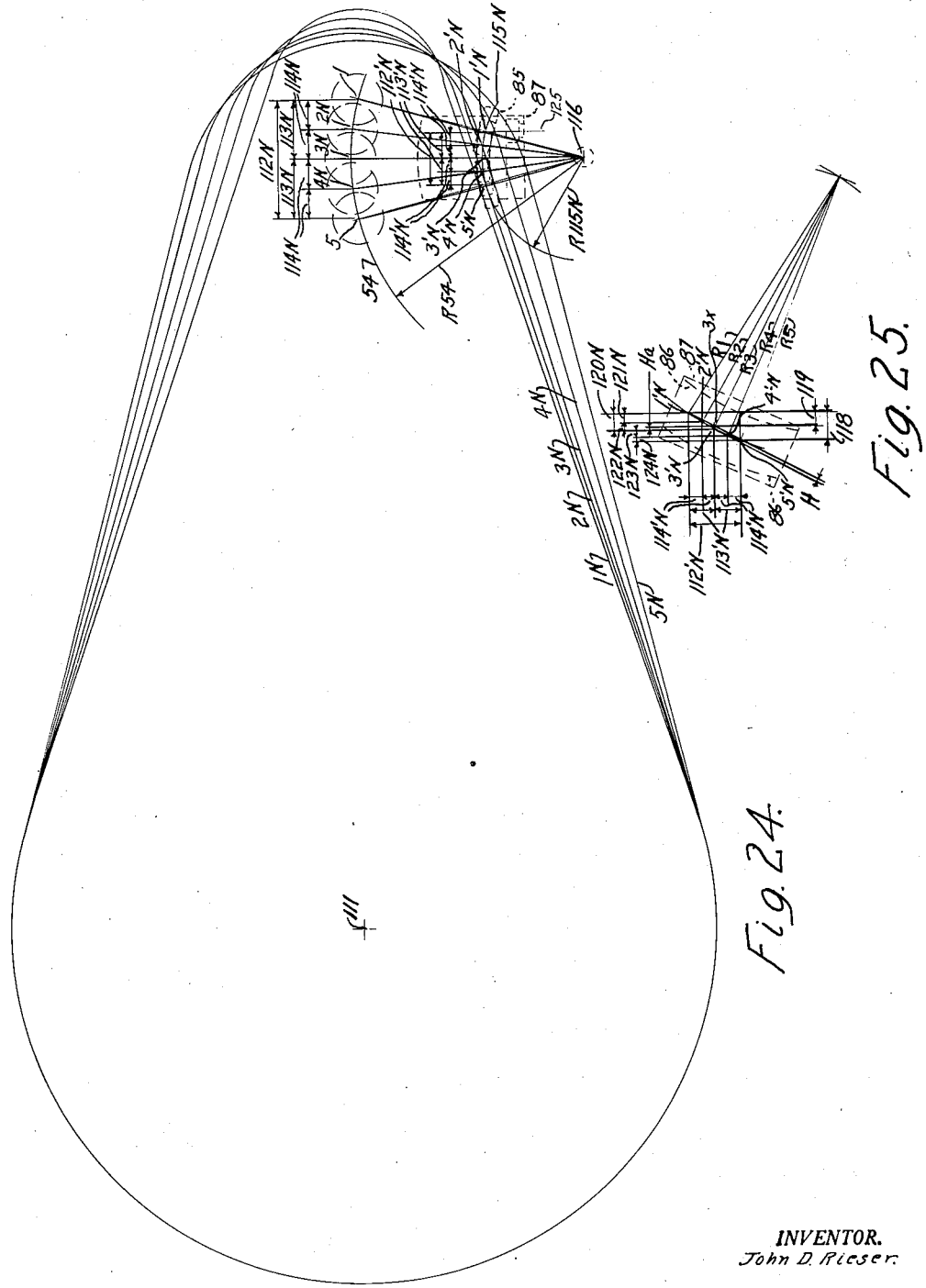
Figure 24 is a side view diagram of a drive having greater initial ratio than that of Figures 20 and 22, but employing the same adjustable pulley and system, the pitch length of the belt being greater than in Figures 20 and 22.
Figure 25 is a plan view diagram of Figure 24 similar to that of Figure 21.

To illustrate the effect of increasing the initial ratio and the belt length on the same adjustable pulley structure, as diagrammed in the Figures 20 to 23, where the minimum and maximum effective diameter of the adjustable pulley structure are unaffected, refer to Figures 24 and 25. These diagrams are similar to those heretofore described, the division positions and distances having like numerated designations, and only where the adjustment is effected in the system to compensate for the specified modification of drive applied, the suffix N is used after the numeral.

Applying the suffix N at corresponding position, the prior description applies to this illustration with the exception that the effective diameter of the fixed structure pulley is greater than maximum effective diameter of the adjustable pulley structure. The arc of contact of the belt on the adjustable pulley is always less than 180 degrees. With the adjustable pulley adjusted to minimum effective diameter, the center distance from position 1 to center 111 is greater than that of Figures 20 and 22. With the adjustable pulley adjusted to maximum effective diameter position, the center distance from position 5 to center 111 is also greater than in Figures 20 and 22; the distance 112-N is less than that in Figures 20 and 22, and the effective diameter of the adjustable pulley at intermediate positions 2-N, 3-N and 4-N, are less than at the corresponding intermediate positions established in Figures 20 and 22.

In diagram in Figure 25 a plan view of Figure 24, similar to those heretofore described, the distances 121-N and 122-N are less than the corresponding distances 121, 121-L, 122 or 122-L of the Figures 21 and 23; the distances 123-N and 124-N are less than the corresponding distances 123, 123-L, 124 or 124-L of the Figures 21 and 23. All the while the distance of 114-N effecting these axial movements is less than the corresponding distances 114 or 114-L, of Figures 20 and 22. The distance 120-N is less than the corresponding division 120 or 120-L of the Figures 21 and 23, while the transverse distance 113-N effecting the axial movement is less than the corresponding distance 113 or 113-L in the Figures 20 and 22. The distances Ha and H are also less than the corresponding distances in the Figures 21 and 23, but not in direct proportion.

To illustrate further the effect of applying a belt having a greater length to the drive of Figures 24 and 25, refer to Figures 26 and 27. These diagrams are similar to those described, and the division positions and distances have like designations, except that where adjustment is effected to the system to compensate for the changed belt length, the suffix P is applied after the numeral.

With the adjustable pulley adjusted to minimum effective diameter, the center distance, position 1 to center 111, Figure 26, is greater than that of Figure 24; with the adjustable pulley adjusted to maximum effective diameter, the center distance, position 5 to 111, is also greater than that of Figure 24; the distance 112-P, is greater than that in Figure 24; and the effective diameters of the adjustable pulley at intermediate positions 2-P, 3-P and 4-P, are each less than at the corresponding intermediate positions established in Figure 24.

In diagram in Figure 27 a plan view of Figure 26 similar to those heretofore described, the distances 121-P and 122-P are less than the corresponding distances 121-N and 122-N of Figure 25; the distances 123-P and 124-P are greater than the corresponding distances 123-N and 124-N of Figure 25. While the distance 114-P effecting these axial movements is greater than the corresponding distance 114-N of Figure 24. The distance 120-P is less than the corresponding division 120-N of Figure 25, while the transverse distance 113-P effecting the axial movement is greater than the corresponding distance 113-N of Figure 24. The distances Ha and H are each less than the corresponding distances in the Figure 25.

Referring to the Figure 4, control member 87 is provided with faces 86 to provide a rolling contact for the roller 85 at a desired and a selected depth to provide a required axial movement relative to the transverse movement and, at mid position, to obtain a required distance H, the control member being provided with pivoted connection described. This pivot of adjustment of the control member 87 coincides with the adjustable pulley structure system adjusted to either the minimum or maximum effective diameter position; and in the illustrations I have shown the system with the adjustable pulley system adjusted to its minimum effective diameter; the center of pivot is the line 125, Figures 20, 22, 24 and 26.

The means for adjusting in radial direction the roller 85, heretofore described, include radial adjustment of the roller with respects the adjustable pulley axis and the center of the spacer shaft 15, while the face 86 of control member 87 is formed parallel to the line 125. Thus were the roller adjusted by the means provided, from a position 1′, Figure 20, to like position 1′-L, Figure 22, the changed location of the roller with respect to the control member does not effect any axial movement and the effective diameter of the adjustable pulley structure is unaffected. The only change effected in the system is the change of the distance 112 to 112-L.

The adjusted position of the roller 85, in radial direction in Figure 4, as diagrammed in Figure 20, position 1′, and the correlated curved path 117, Figure 21, as described, having been constructed, it being desired to effect the change to the drive described in Figures 22 and 23, the following steps are necessary to fulfill the changed conditions encountered and described, the roller 85 is adjusted by the means provided to the position represented by R-115-L which will effect the roller center actuating on its transverse arc of travel 115-L, the control member being pivoted at position 1′, Figure 21, or position 1′-L, Figure 23. The rotation of the control member in an arc about its pivot to a position whereby the distance 112-L, coincides with the distance 118, completes the adjustment. The locking means is then applied to fix the adjustment. The pivot for the adjusting of the control member being located to coincide with one of the extreme positions of the adjustable pulley effective diameter, provides the means whereby, upon effecting an adjustment, the effective range of the adjustable pulley is maintained.

If it is desired to effect a change in the drive of Figures 20 and 21 to the drive described in Figures 24 and 25, to fulfill the change and to move the roller to suit conditions encountered and described, the roller is adjusted by means provided to position the roller represented by R-115-N. This will effect the roller center, actuating on its transverse arc of travel 115-N, the control member being pivoted at position 1', Figure 21 or position 1'–N, Figure 25. The rotation of the control member is over an arc about its pivot to a position wherein the distance 112–N coincides with the distance 118 to complete the adjustment. The locking means is then applied to fix the adjustment. Similarly, the system can be adjusted by the means provided to conform to the drive of Figures 26 and 27, or other drives within the range of a system.

Analysis of the adjustment means provided to adjust a system will show it provides means whereby the transverse movement distance may be increased while the distance H is decreased or increased at will, or that the transverse movement distance may be decreased while the distance H is increased or decreased at will. In such a system, an adjustment being effected, it will be found upon actuation that the speed change means maintains a condition of substantially constant belt path length throughout range of the speed adjustments; also that the effective diameter range of the adjustable pulley is maintained.

Figure 7:
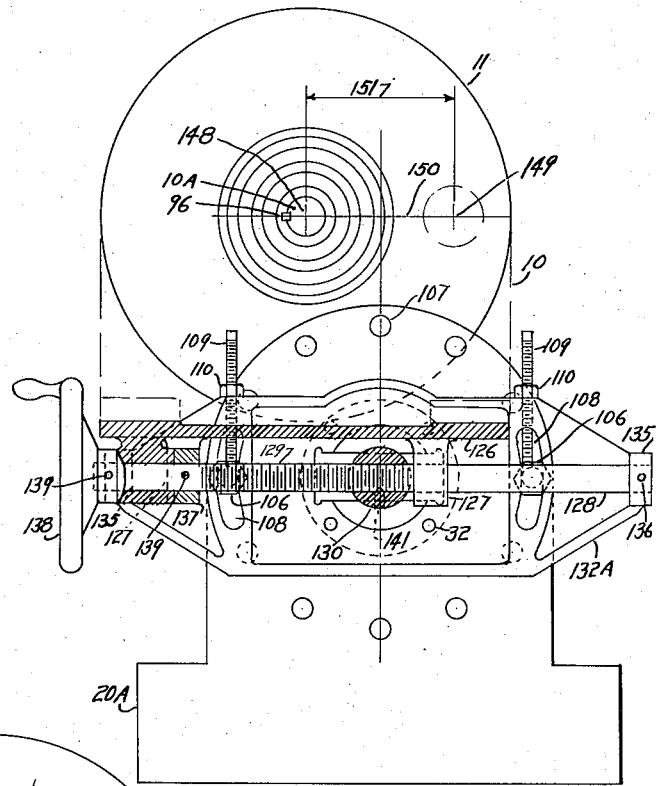
Figure 7 is an end section of Figure 6 to show the adjustment means.
Figure 8:
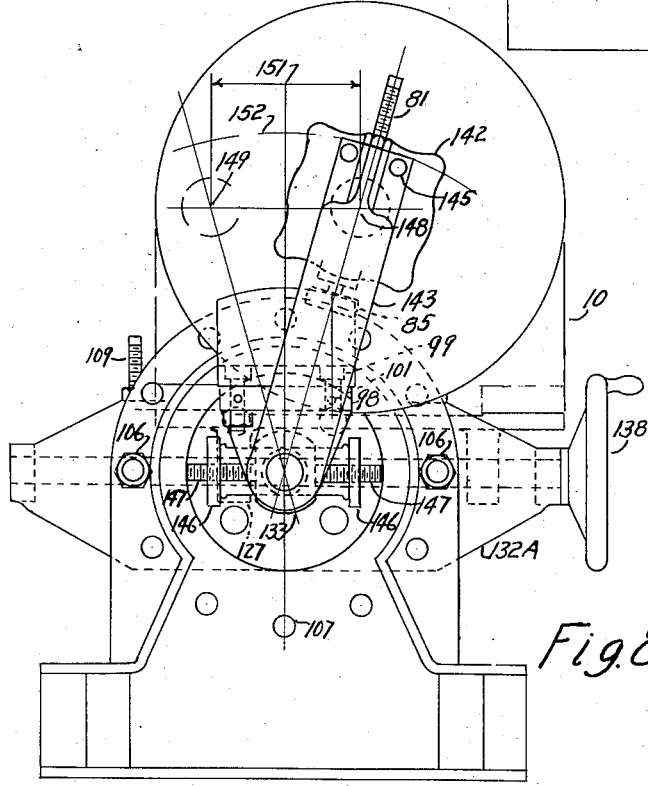
Figure 8 is an end view taken from the pulley side in Figure 6.

The adjustable pulley structure heretofore described includes a transverse movement along an arc when effecting a speed change while in Figures 6, 7, and 8 the adjustable pulley structure includes a transverse movement actuated on a straight line when effecting a speed change.

In Figure 6, motor 10 is rigidly fastened in regular manner (not shown) to bracket 126, the bracket has rib bosses 127 extending endwise and at suitable positions to coincide with guide rods 128 bored to allow the guide rods to pass therethrough and bored to provide bearing for the operating screw 129. The guide rods and the operating screw are located in an endwise direction of the bracket 126 and the motor 10. The spacer shaft 130 is provided with milled surfaces 17 and 17A, to match slots in the end plates 18 and 131 (see Figure 7). The end plate 131 is turned to match bore in the base half 20 at 21, and the guide bracket 132 at 23. At opposite side, the end plate 131 is turned to match bore in the base half 20A at 24 and guide bracket 132A at 26. The milled surfaces 17 and 17A on the spacer shaft provide the spacer faces 27 and 27A, for spacing of the base halves and the side plates 18 and 131. The spacer shaft has adjacent to the milled surface 17 threaded portion 28, to match nut 30. At opposite side it is provided with set collar 133, anchored to spacer shaft by setscrew 134. The end plates 18 and 131 and the guide brackets 132 and 132A are provided for the screws 32 to fasten same together and clamp therebetween the web of the base halves. The end plates, entering the bores in the base halves from opposite directions, together with the spacing shoulders 27 and 27A, and the nut 30 and set collar 133 on the spacer shaft, form a rigid structure, and endwise spacing and clamping the base halves.

The guide brackets 132 and 132A have, at opposite ends thereof, lugs 135 bored to form an anchorage for the guide rods, with setscrews 136. The operating screw is journaled in the bracket 126 in rib 127 and is locked against endwise movement by the collar 137 and the hub of the handwheel. The collar and handwheel hub are attached to the operating screw by the pins 139. The operating screw has screw threads 140 thereon; the spacer shaft is provided with screw threads to match threads on the operating screws; and at the guide rods it is provided with holes for the guide rods; the guide rods are anchored on the spacer shaft by the setscrews 141.

Thus, actuation of the handwheel rotates the operating screw and causes transverse movement of the bracket 126 and the motor 10. The bracket is slideably mounted on guide rods by bosses 127. The motor shaft has mounted thereon an adjustable pulley structure, similar to that heretofore described, with the exception that cap 72 is replaced by a generally similar cap 142 which has, on an outer portion, a slot in which in a slideable manner, is located a portion of the roller bracket 143. The roller bracket is attached in slideable form to the cap by keepers 144 fastened to the cap by the screws 145. Thus, when axial movement is effected in the system, the roller bracket is also effected in an axial direction. The roller bracket is provided with threaded hole 80 to receive the threaded rod 81, the rod 81 and the attached structure has the same purpose as that heretofore described. The opposite portion of the roller bracket is mounted about an extention of the spacer shaft to permit the roller bracket to rotate through an arc about the spacer shaft and slide in an axial direction upon effecting a change in the effective diameter of the adjustable pulley. The transverse movement and the correlated axial movement, theretofore described, is uneffected by providing a straight line transverse movement of the adjustable pulley structure.

The provision of means to effect a change of position in the system by the slots in the side plates 18 and 131 includes side plate 131 with two lugs 146 threaded for screws 147, Figure 8. These screws are threaded through the lugs with one end bearing upon flat faces provided at opposite sides of the collar 133 which lock the spacer shaft in an adjusted position relative to the slots. To change position of the spacer shaft within the slots, the screws are moved in same direction to effect a change in the position of the spacer shaft and the system thereof; these screws serve same purpose as the screw 50 of the system heretofore described.

Referring to Figure 7, the guide bracket 132A, to which end plate 131 is fastened by the screws 32, is adjustable in rotatable direction of the base together with the spacer shaft 130 and the structure mounted thereon; this provides a system similar to that heretofore described, whereby the spaced parallel mounted pulley structure may be positioned irrespective of the base setting, the guide bracket 132A, having slotted holes 108 the same as that described for the operating bracket 25 in Figure 5.

The position 148 is the location of the adjustable pulley structure center when the system is adjusted to the minimum effective diameter. The position 149 is the location of the like center when the system is adjusted to its maximum effective diameter with the system assembled as shown. When assembled for the opposite hand, the locations are reversed, the transverse movement of the adjustable pulley center being on the line 150, distance 151. The end of roller bracket 143, transverse movement being effected on the arc 152, Figure 8.

The Fig. 14 shows a variable speed compact system to afford mounting the mechanism on a drive or driven shaft, and wherein large differences are obtainable between drive and driven shaft speeds, and the adjustable pulley system actuating about the axis of gear or the like when effecting a change of the position and/or the effective diameter of the adjustable pulley; referring to Figure 14, the stationary gear case 153 is constructed of two sections, the base section 154, and the cover section 155, joined together by screws 156, 157 (see Figure 17) and studs 158. Base section has a suitable base pad 159, located with respect to the bearing hub 160. The hub 160 is bored to accommodate the outer race of bearing 161, which is mounted on a portion of the gear hub 162, another portion of the gear hub is located on the inner race of bearing 163, while outer race of this bearing is located within the hub of cover section 155 and is locked in position in an endwise direction by the snapring 164 and cap 165. The cap is fastened on to the cover section by screws 166. The inner race of bearing 163 is positioned on hub 162 by keeper 167 fastened to the hub by screws 168. Thus, the hub is positioned in endwise direction. The bearing 161 is positioned by the snapring 169 and by the collar 170, which is attached to the hub by set screw 171. The hub is centered on and fastened to the gear 172 by screw 173. Thus, the gear and hub are journaled for rotation. The hub 162 has a bore 174 keyseated for insertion of a shaft or like device (not shown), for rotational movement. The setscrew 171, bearing upon the shaft of the device, positions the same in endwise direction. In spaced parallel relationship to the hub 162 is shaft 175, journaled for rotation in the bearings 176 and 177. The inner race of each of these bearings is mounted on the shaft, the inner race of bearing 176 being positioned by keeper 178 fastened to shaft by screws 179. The outer race of bearing 176 is mounted on the base section 154. The bearing 177 outer race is mounted on the cover section 155 and positioned by the snapring 181 and keeper 182, the keeper being fastened to the cover section by screws 183. On the shaft 175 is mounted the pinion gear 184, keyed to the shaft by key 185. The pinion gear has gear teeth to match like gear teeth of the gear 172; thus, the shaft and the hub are joined by the mating gear teeth, rotation of one effects similarly the other. On another portion of the shaft 175 is mounted the gear 186, keyed to the shaft by key 187. About this gear is pivoted the gear case 188, constructed of two sections, a rear section 189 and a forward section 190. About the shaft 175, adjacent the hub of the gear 186, are bearings 191 and 192. The inner race of these bearings, gear hub, spacer 180 and the inner race of bearing 177 are all positioned on the shaft by the shoulder of the shaft 175 and the keeper 193, which is fastened to shaft end by screws 194. The outer race of bearings 191 and 192 are located within bores of the rear section 189 and the forward section 190. The forward end of bore for bearing 192 is provided with a cover plate 195, the cover plate being fastened to the forward section by screws 196. The outer race of the bearing 191 is positioned endwise between the hub of worm gear segment 199 and the keeper 197, fastened to rear section by the screws 198. Thus, in this illustration, the pivot of the gear case 188 is about the shaft 175.

In a spaced parallel relationship to shaft 175 is shaft 200, journaled for rotation in the bearings 201 and 202. The outer races of these bearings are mounted on the gear case 188; the outer race of bearing 201 being locked in endwise direction. The inner races of these bearings and the gear pinion 205 are mounted on the shaft and are positioned by shaft shoulder, the spacers 203 and 204, and the locknut and washer 206, threaded on the shaft end. The gear pinion is keyed to the shaft by key 207. The gear pinion has gear teeth to match like gear teeth of the gear 186. Thus the shafts are joined by the mating gear teeth, rotation at one shaft effects a similar motion in other shaft.

About another portion of the shaft 200 is an adjustable pulley structure and system that may be similar to that heretofore described, with the exception that the shaft portion being hollow, serves similar to that of the hollow sleeve shaft 67, and the bracket 208 in the form shown, supports, in an adjusted position, the control member 87, in place of the bracket 98 of Figure 4.

Between the gear case 153 and gear case 188 is the adjuster housing 209, constructed of two sections, a body section 210, and a cap section 211. The two sections are fastened together by screws 213 and bolts 214 (Figure 18). The body section has an extension spanning the gear case 188 and to which is rigidly attached by bolts 218 the bracket 208. On an interior portion of the body and cap sections is positioned the clamping ring 212. The clamping ring is centered about the shaft by bearing upon the hub of the cover section 155; the studs 158 being fastened into the clamping ring. Tightening of the nuts of the studs causes clamping of the adjuster housing 209 to the gear case 153 in an adjusted position as hereinafter described.

Referring to Figure 18 the screw rods 219 are connected pivotally to clevises 215 by pins 216. The clevises are rigidly attached to the adjuster housing 209 by the bolts 214. The threaded portion of the screw rods pass through swivel lugs 217 connected to the gear case in a desired location by the screws 157 (see Figures 17, 18 and 19). The screw rods pass through a portion of the swivel lugs and nuts thereon bear upon faces of the swivel lugs to lock, in an adjusted position, the adjuster housing 209 to the gear case 153. This mechanism also serves to secure a fine adjustment of position of the adjuster housing, and of the gear case 188, the adjuster housing 209 being joined about the hub of the rear section 189 to permit rotative movement.

The worm gear segment 199 is fastened to the rear section 189 by screws 219A, concentric about the pivot of the system. The worm gear segment is in mesh with the worm 220; and as a part or attached to the worm is a worm gear 221 (see Figure 18). The worm assembly is journaled in the bearings 222 and 223, of which the inner races are fitted to the worm assembly, while the outer races are fitted to spacers 224 and 225 positioned in the body section 210 in spaced relationship but, at right angle to the shaft 175. The snap ring 226 is keeper. The crank rod 227 has a crank 228 at one end and, at its other end, has worm threads to match the worm gear 221. The crank rod is journaled at 229 in the body section 210 in spaced relationship to the worm 220 axis. The crank rod is positioned endwise by a shoulder thereon in contact with a face of the journal 229 and the keeper 230 fastened to body section by the screws 231.

Referring to Figure 19, an end view of Figure 17 or 14, the adjustable pulley system is shown as adjusted to its maximum effective diameter; the position 232 is the location of the adjustable pulley center and the position 231A is the location of the same center with the adjustable pulley system adjusted to its minimum effective diameter. The transverse movement of the adjustable pulley center travels on the curved path 54; the adjustable connection between the gear case 153 and the adjuster housing 209, hereinafter described, is adjusted and secured by the clamping ring 221 and screw rods 219.

In operation; the device is mounted upon a fixed structure as by the base pad 159; the gear case 153 and the adjuster housing 209, along with that portion of the system fixed thereto, is the stationary portion of the structure or system relative to the means moved upon effecting a change of the effective diameter of the adjustable pulley or rotation of the shafts. To effect a change in the effective diameter of the adjustable pulley from the position shown in Figure 19 towards or into the position 231A, the crank 228 is turned in a direction to cause rotation of the worm 220 whereby the worm gear segment moves in a direction to the left of the vertical center line 233. The worm gear segment, being rigidly secured to gear case 188, the gear case 188, together with that portion of the system fixed thereon, rotates through an arc in a direction opposite to the worm gear segment movement about the shaft 175 or towards the location 231A. Simultaneously a change is effected in the position of the adjustable pulley center on the arc of travel 54, effecting the correlated axial movement (as heretofore described) and the effective diameter of the adjustable pulley changing. The moving through an arc of that portion of the system, when effecting a change in position of the adjustable pulley structure about the pivot, does not interfere with the rotation of shafts or the fixed spacings of mating gears, the actuating means being of a design to avert upset of adjustments by forces effected about the pivot.

Figure 17 is a side view of Figure 14 with the adjustable pulley adjusted to maximum effective diameter. In this view portions of the structure are broken away to show the position of the rack members. The base pad 159 is indicated as bolted to a channel structure by bolts and screws indicated. The bearing 161 positioned about the bored hole 174, receives the shaft of a device to be driven, being of ample section to serve both the variable speed device and the end of shaft of a device to which it is to be connected, or a male end shaft may be used in place of the female shaft to allow for mounting of sprocket or the like.

Figure 12:
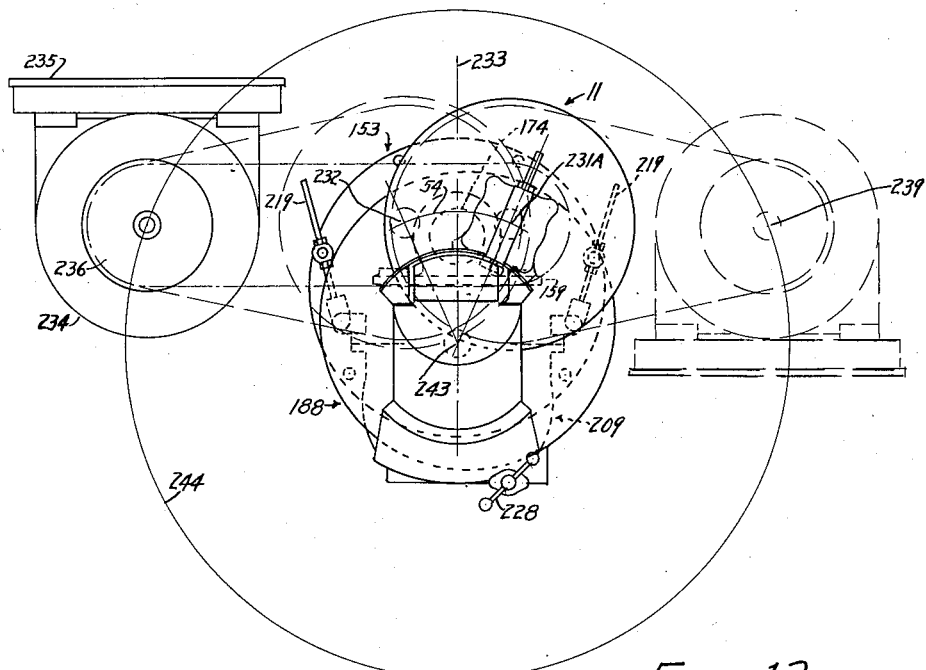
Figure 12 is an end view of the drive shown in Figure 10 with the exception that the system is adjusted to accommodate the different angularity of drive, and is a horizontal drive arrangement, the base position of the device being positioned similarly in both Figures 10 and 12.

In Figure 10, a gear type variable speed transmission is shown in alignment with a V grooved pulley 236 of fixed effective diameter, mounted on a shaft projection of a standard motor 234, the motor being attached in regular manner to a motor base 235, and the motor base attached in usual manner to a fixed structure (not shown). The pulley 236 is connected to the adjustable pulley structure which is shown adjusted at minimum effective diameter by endless V belt represented by the pitch line 237, the center of the adjustable pulley being adjusted to minimum effective diameter is position 231A. The position 232 is its center when adjusted to maximum effective diameter; the dash line circle scribed about the position 232 and belt line 238, connecting thereof indicates the outline of drive when adjusted to minimum speed position; when the adjustable pulley adjusted minimum effective diameter position 231A is adjustment of maximum speed. The motor and fixed effective diameter pulley center remain in an adjusted position as different speed adjustments are effected and, as heretofore described, a condition of constant belt path length is maintained throughout the range of speed adjustments, the motor speed remaining constant. Figure 9 is a plan view of the structure of Figure 10, with the motor frame broken away. Figures 10, 11 and 12 show end views of like drives, the system adjusted to three different positions to accommodate various angle of the drive, the base pad 159 of the gear type variable speed transmission remaining in the same position in each case.

Figure 12 is an end view of the variable speed transmission device wherein the relative adjustment of the gear case 153 and the adjuster housing 209 is the same as that described in Figure 19, the adjustable pulley being adjusted minimum diameter, the assumed vertical center line 233 being the mid position of transverse movement. Position 231A is the location of the adjustable pulley center when adjusted to minimum effective diameter and position 232 the location of the same when adjusted to maximum effective diameter. The drive is the same as described in Figure 10 and with respects to the line 233, the drive being directed in a horizontal direction. The motor and its base can be mounted on a floor or ceiling, in the position shown or, when system assembled in the opposite hand, it would be located in position 239, as indicated by dash lines, the base pad position being also horizontal.

Figure 11 shows an end view of the variable speed transmission device wherein adjustment is effected relative to the gear case 153 and the adjuster housing 209, the base pad 159 and the vertical center line 233 remaining in the same position as in Figure 12. Figure 11 shows a vertical drive while Figure 12 is a horizontal drive; the line 240 represents the mid position of transverse travel and the location of the adjustable pulley center when adjusted to minimum effective diameter is 231A. The position 232 is location of the same when adjusted to maximum effective diameter. The drive is likewise the same as described Figure 10; and with respects to the line 233, the drive is directed in a parallel direction. The motor can be mounted as shown or with its base wall mounted at position shown or, when system is assembled the opposite hand, it would be located in position 241, as indicated by dash lines. The base, as heretofore mentioned, as horizontal.

Figure 10 shows an end view of variable speed transmission device different from that of Figures 11 and 12. Adjustment is effected relative to the gear case 153 and the adjuster housing 209, the base pad 159 and the vertical center line 233 remain in the same position as in Figures 11, 12 and 19. The direction of drive in Figure 10, relative to the other drives described, forms an oblique angle; the line 242 represents the mid position of transverse movement. The motor and its base can be floor mounted at the position shown or, if the system assembled the opposite hand, it can be located above on the opposite side of line 233. The base, as heretofore mentioned, is horizontal.

The adjustment system hereinafter described provides means whereby the drive may be directed to any position on a circle scribed about the pivot of the system. For example, in Figure 12, the pivot of the system, relative to other portion of the system, is about the position 243 and, for the drive illustrated, the motor, with the fixed effective diameter pulley may be located at any position on the circle 244, the position of the base pad 159, or, other anchorage together with the gear case 153, being assumed as fixed in the position shown (although base may be mounted in other desired positions.) The rotatable portion of the system can be adjusted to correspond. The radius of the circle 244 obviously is determined by the length of the applied belt and the effective diameters of the pulleys; correspondingly, the adjustable pulley structure may be adjusted to conform to the belt length utilized.

Referring to Figure 14, the means whereby the adjustable pulley system can be adjusted to a fixed position of the geared system is as follows: the adjustable pulley structure, together with assembled mechanism, form a unit fulcrumed about the shaft 175. The linkage between the unit and the adjuster housing 209 is through meshing of the worm gear segment 199 teeth and the teeth of the worm 220 and its fixed relationship to the adjuster housing. The movement about the shaft 175 of the assembly is effected only by actuation of the crank 228, as described. The adjuster housing is fixed in an adjusted position to the gearcase 153 by means described. By loosening the nuts on the studs 158 whereby the adjuster housing is clamped to the gear case 153 by the clamping ring 212, and in Figure 13 by unscrewing the nuts on the screw rods 219, one can turn the adjuster housing 209, together with that portion of the system linked thereto about the shaft 175. Should the amount of turning movement provided by length of the screw rods be insufficient to permit movement of the adjustable pulley structure to a desired location, the screw rods can be detached from the system and the adjuster housing, together with that portion of the system linked thereto, turned to any desired position on the circle. The adjustment being effected, the screw rods and swivel lugs 217 are again attached to the gear case 153, as heretofore described, in a location within the reach of the screw rods, there being a circle of holes about the gear case. Assuming that the adjusted position effected does not precisely coincide with that desired, the screw rods, together with the nuts thereof, form means of fine final adjustment in addition to forming a fixed locking means of an adjustment. To complete the adjustment the nuts of the studs 158 are tightened, thus again clamping the adjusting housing 209 to the gear case 153. Thus is provided a universal drive mounting of the device whereby the drive may be positioned independently of the anchorage. The device also may be applied and actuated in like manner in a horizontal position wherein the shafts are in vertical plane or, at any angle between a vertical and a horizontal plane. The adjustment means described effects no upset of other means or of the fixed gear shaft centers.

The diagrams Figures 28 and 29 are similar to those heretofore described, and are of the drive of Figure 10, where the adjustable pulley, adjusted to minimum effective diameter, is equal to the effective diameter of the fixed pulley; while in those heretofore described, this condition is reversed. In the drive of Figure 10, the motor speed being constant, the belt speed remains constant throughout the range of speed adjustments while in those heretofore described the belt speed changes.

Referring to Fig. 28, the division positions, the distances and similar parts have like numerated designations to that of Fig. 20, and only where there is a difference I have applied the suffix G after the numeral. The center 243 is derived and is the same as that of Fig. 19, and corresponds, when comparing diagrams, to center 116 of the described diagrams. The lines 1G, 2G, 3G, 4G and 5G, represent the pitch line of the belt and throughout the range are of like length; the curved portion represents the arc of contact on the belt on the adjustable pulley effective diameter. The curve of line 1G is scribed from the position 1G; the curve of line 2G is scribed from the position 2G; the curve of line 3G is scribed from the position 3G; the curve of line 4G is scribed from the position 4G; and the curve of line 5G is scribed from the position 5G; and curved portion of these lines at the fixed effective diameter pulley are scribed about the center 111-G, and likewise represent the arc of contact of the belt at this pulley effective diameter; the tangent portion of these lines, connecting the curved portions, represent the straight portion of the belt connecting the pulleys, the belt being endless. These pitch lines are all of equal length, fulfilling a condition of constant belt path length throughout the range of speed adjustments. The position 1-G, and the arc of circle scribed about this position, represent the center of the adjustable pulley with the system adjusted to minimum effective diameter. The distance from the position 1-G to the center 111-G represents the center distance between the two parallel pulleys, and it also is position of maximum speed adjustment. The position 5-G and the arc of circle scribed about this position represent the axis center of the adjustable pulley with system adjusted to the maximum effective diameter. The distance from the position 5-G to the center 111-G represents the center distance between the two parallel mounted pulleys and, when so adjusted, is in a position of initial ratio of drive, and the center distance between the pulleys is at a minimum. The distance 112-G, from position 1-G to 59 is transverse movement from minimum to maximum effective diameters of the adjustable pulley, the distance 113-G, from the positions 1-G to 3-G and 3-G to 5-G, equal to one-half the distance 112-G. Thus, position 3-G, is the mid position of the transverse movement. The arc of circle line 3-G, scribed about this position, represent the arc of contact of the belt on the adjusted effective diameter at the mid position. The distance 114-G, from the positions 1-G to 2-G, 2-G to 3-G, 3-G to 4-G and 4-G to 5-G, all of like length complete the five division positions of the transverse movement. The arc of circles 2-G and 4-G, scribed about the positions 2-G and 4-G, represent the arc of contact of the belt at the adjusted effective diameters at the one-quarter and three-quarter positions. Establishing of the enumerated positions, the minimum and maximum effective diameters of the adjustable pulley and the pitch length of the endless belt connecting about the two pulleys, the effective diameters at the intermediate positions are readily computed, a constant belt path length throughout the range of adjustments being maintained.

The dotted lines show outline of the control member 87. The roller 85 is also indicated in dotted lines in the five positions about the control member. The center 243 is pivot of the structure, and of the shaft 175, about which the structure is actuated, and the arc of travel 54, and the arc 115-G of transverse movement of the roller 85. The radial lines from center 243 are scribed to the positions 1-G, 2-G, 3-G, 4-G and 5-G, on the arc of travel 54 to locate corresponding adjusted positions of the correlated transverse movement and the axial movement at the intersection of the radial lines and the arc 115-G. Thus the positions 1'-G, 2'-G, 3'-G, 4'-G and 5'-G, on the arc 115-G represent corresponding positions on the arc of travel 54, and the transverse distances 112'-G, 113'-G and 114'-G, are likewise in proportionment of the transverse distances 112-G, 113-G and 114-G.

The diagram Figure 29, is a plan view of Figure 28, of the proportionment transverse movement path and correlated axial movement. The correlated curved path 117-G represents the center path of the roller 85. In this diagram, like divisions have like designations. The position 1'-G is center of the roller when the adjustable pulley is adjusted to minimum effective diameter. The position 5'-G is center of the roller when the adjustable pulley is adjusted to maximum effective diameter. Therefore, the distance 118-G, from 1'-G to 5'-G in a direction perpendicular to the transverse movement, represents the axial movement of pulley section when effecting adjustment from a minimum to a maximum effective diameter. Having the effective diameters of the adjustable pulley structure to coincide with the transverse movement of the adjustable pulley center on the arc of travel 54, at the five positions enumerated, while maintaining the condition of a constant belt path length throughout entire range, and knowing the difference between maximum and minimum effective diameters of the adjustable pulley, and the angle of faces thereof, the distance 118-G, is readily found. Having determined the proportionment position of the arc 115-G, of roller center travel, the connection of the position 1'-G and 5'-G by straight line forms a side of a triangle. From the position 1'-G, a line equal to the length of the proportionment transverse movement parallel to the transverse movement forms another side of the triangle. A line from position 5'-G, perpendicular to the transverse movement distance 118-G, forms the other side of the triangle. The distance 119-G, equal to one-half the distance 118-G, and a line constructed from this point parallel to the transverse movement, intersects at position $3x$, the line representing one-half the proportionment transverse movement 112'-G. The distance 120-G represents the axial movement distance effected upon effecting the transverse proportioned movement distance 113'-G from minimum effective diameter position to mid position 3'-G travel. The difference between the distances 120-G and 119-G, equals H$a$. The triangle being constructed and having the distances thereof, the angle is readily found. Having the angle and H$a$, the distance H is readily determined. H and the related positions 1'-G and 5'-G, the radius of the curve 117-G, is determined, and is equal to R1—G, R5—G and R3—G. The distance 121-G, represents the axial movement of the effective diameters from position 1'-G, to first-quarter position 2'-G, the correlated transverse movement is 114'-G. The distance 122-G, represents the axial movement of adjustment of the effective diameters from first-quarter position 2'-G to mid position 3'-G, the correlated transverse movement is 114'-G. The distance 123-G represents the axial movement of adjustment of the effective diameters from mid position 3'-G to third-quarter position 4'-G, the correlated transverse movement is 114'-G. The distance 124-G represents the axial movement of adjustment of the effective diameters from third-quarter position 4'-G to position 5'-G, or maximum effective diameter position, and the correlated transverse movement is 114'-G. The two correlated movements being in a perpendicular direction to one another, the lines terminating the distances 121-G, 122-G, 123-G and 124-G, are constructed parallel to the transverse movement, the lines terminating the equal divisions of the transverse movement 114'-G are constructed parallel to the axial movement and intersect at the positions 1'-G, 2'-G, 3'-G, 4'-G and 5'-G, on the curve 117-G. It will be seen that throughout the range of adjustment, the correlated movements effected are on curved path, the condition of constant belt path length being maintained and changes in the drive ratio being continual.

NOTE.—The transverse movement distance divisions are all alike and that the correlated distances representing the axial movement vary for each division and that the axial movement distance become greater as an adjustment is effected towards the one to one ratio of drive position, it being greatest as it approaches the minimum effective diameter position, and that the ratio of movements, between the transverse movement distances to that of the axial movement continually varies.

To illustrate the effect when applying belts having greater length to the drive diagrammed in Figures 28 and 29, the minimum and maximum effective diameters of the adjustable pulley structure are substantially unaffected. Referring to the Figures 30 and 31, these diagrams are similar to those heretofore described, the division positions and distances have like numerated designations, and only where the adjustment effected to the system to compensate for a changed belt length have applied the suffix H after the numeral. The condition of constant belt path length is maintained throughout to conform to the changed belt length.

Detailed description is omitted as it would be similar to that heretofore applied to the drive of Figures 22 and 23, in comparison with Figures 20 and 21. The suffix H being applied to the corresponding numerals and other designations to correspond to this drive and the description would apply to this comparative condition but, where a different effect occurs the same is here described: (1) The initial ratio of drive is the same as that of Figure 28, and is with the adjustable pulley adjusted at maximum effective diameter, while in Figures 22 and 20, it is opposite. (2) The distance 112-H, from position 1-G to 5-G, represents the total transverse movement from minimum to maximum effective diameters of the adjustable pulley and is less than that effected in Figure 28, while in Figure 22, vis Figure 20, it is greater. (3) The distance 121-H represents the axial movement effected in adjustment of the effective diameters, from minimum position 1'-H to first-quarter position 2'-H. This is less than 121-G, in Figure 29, and the transverse travel 114-H, effecting this travel is less than 114-G, Figure 29, while the effect Figure 23, vis Figure 21, is greater. (4) The distance 122-H represents the axial movement of an effected adjustment of the effective diameters from first-quarter position 2'-H to mid position 3'-H, is less than 122-G, in Figure 29, and transverse travel 114-H effecting this travel is less than 114-G, while the effect of Figure 23, vis Figure 21, is greater. (5) The distance 123-H represents the axial movement of an effected adjustment of the effective diameter from mid position 3'–H to third-quarter position 4'–H, is greater than 123–G, in Figure 29, and the transverse travel 114–H, effecting this travel, is less than 114–G, in Figure 29, while the effect in Figure 23, vis Figure 21, is greater. (6) The distance 124–H represents the axial movement of an effected adjustment of the effective diameter from third-quarter position 4'–H to position 5'–H, is greater than 124–G, in Figure 29, and the transverse travel 114–H, effecting this travel, is less than 114–G, in Figure 29, while the effect in Figure 23, vis Figure 21, is greater. (7) The distance 120–H represents the axial movement of an effected adjustment of the effective diameter from minimum effective diameter position 1'–H to mid position 3'–H, is less than 120–G, in Figure 29, while the transverse travel 113–H, effecting this travel is less than 113–G, in Figure 29, while the effect, Figure 23, vis Figure 21, is greater.

The effect of applying a longer belt to one drive is that the transverse movement distance increases, while the H distance decreases; and in the other drive the transverse movement distance decreases, and the H distance decreases, but not in direct proportion.

Figure 13:
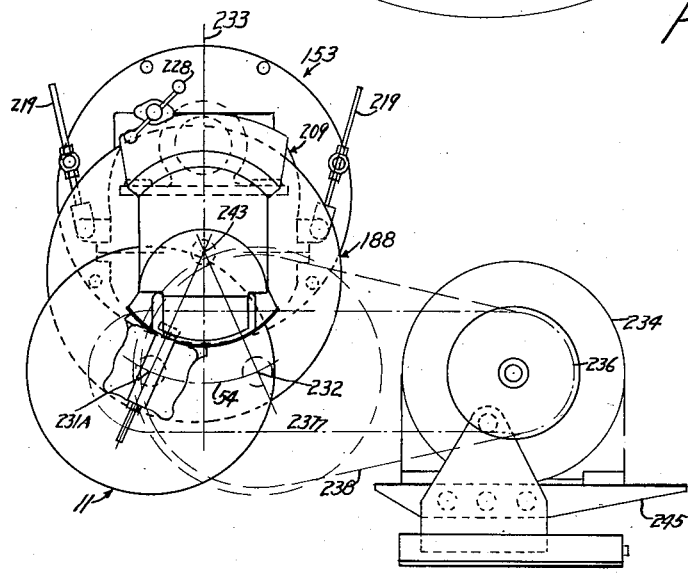
Figure 13 is an end view of the same drive shown in Figure 10 with no change in the position of the base of the device, but the system adjusted with the adjustable pulley structure positioned vertically below the base, and the motor with its fixed effective diameter pulley mounted on a pivoted motor base.

Figure 13 shows an end view of a drive employing the gear type variable speed transmission device mounted and adjusted similar to that described, the fixed effective diameter pulley mounted on the shaft projection of the motor 234. The motor is attached in the usual manner (not shown) to a pivoted motor base, the pivoted motor base to be fixed on a foundation or like (not shown). The motor and pivoted motor base being well known in the art of transmission, detail description therefore is omitted.

In this combination, to effect transverse movement of the adjustable pulley structure, when effecting speed adjustments, is actuated by means heretofore described, through actuation of the crank 228, and with positive means employed the correlated movement, the control member may have curved path as described, effecting varying ratio of movements between the two correlated movements. In this event, the center of the fixed effective diameter pulley remains in a substantially stationary position of the pivoted motor base, throughout the range of speed adjustments while the bolt path length is constant. Or the control member may be of a form whereby the ratio of movements between the two correlated movements about the control member remains substantially constant, and in which event the center position of the fixed effective diameter pulley changes position by the pivot of the pivoted motor base and also effects a condition of substantially constant belt path length throughout range of speed adjustments.

And with this combination, and when employing positive control means changing the effective diameter of the adjustable pulley, the means applied, may be of fixed relationship and to compensate for change of conditions when length of belt is changed or, the initial ratio of a drive, the difference is compensated for by the pivoted motor base.

The adjustment system heretofore described, whereby the drive may be directed to any position on a circle scribed about the pivot of system, is unaffected by the application of the pivoted motor base combination of a variable speed drive, as is well known in the art, pivoted motor bases provide for drives of various angularities.

It is obvious that the variable effective diameter pulley system may be positioned of the pivoted motor base and the fixed effective diameter pulley structure mounted in parallel relationship thereto, or that the operator operating means effecting transverse movement at one pivoted structure may be extended to the other pivoted structure.

It will be recognized by those skilled in the art of transmission that a desired difference between the drive and driven shaft speeds is obtainable by a system utilizing less or more reduction sets, than the details show, yet will achieve similar results without departing from the spirit or scope of the invention.

I claim:

1. In combination, a V pulley having a pair of cooperating sections, forming, by axial movement with respect to one another, a V pulley of variable effective diameter, means to effect axial movement with respect to one another of said pulley sections, a shaft supporting said V pulley for rotation, means supporting said shaft support for rotation about a pivot, said pivot being parallel to but spaced from said shaft, and positive means for moving said shaft transversely to the axis of said shaft, said transverse moving means and said means for axial movement cooperating to effect simultaneously said two movements upon actuation of said positive moving means throughout the range of the effective diameter of said V pulley, and means for adjusting said positive means to change its transverse movement range while substantially retaining said axial movement range.

2. In combination, a first pulley of fixed effective diameter, a second pulley, an endless V belt trained about said first and said second pulley effective diameters, said second pulley being of variable effective diameter size to vary the drive ratio between said pulleys, a shaft supporting said second pulley for rotation, means supporting said shaft for rotation about an axis parallel to but spaced from the axis of said shaft, and means connected to said shaft support (1) for moving said shaft towards or away from said first pulley, and (2) simultaneously to vary the effective diameter size of said second pulley, and (3) to maintain a condition of substantially constant belt path length about and between the effective diameters of said pulleys throughout range of variable drive ratio between said pulleys.

3. In combination, a hollow shaft, means to support said hollow shaft for rotation, means joined to said support to effect movement of said hollow shaft in direction transverse to the axis of said hollow shaft, a first and a second V belt pulley section mounted on said hollow shaft movable with respect to each other axially on said hollow shaft to form a V belt pulley of variable effective diameter, a first rack in said hollow shaft joined to said first V belt pulley section, a second rack in said hollow shaft joined to said second V belt pulley section, a gear supported for rotation in said hollow shaft connecting said racks, and means for moving one of said racks conjointly with the movement of said shaft means to move said first and said second V belt pulley sections in opposite directions.

4. In combination, a V pulley of variable effective diameter, a shaft supporting said V pulley, means for effecting variation in said V pulley effective diameter, a base structure including a stationary portion and being mountable on a fixed foundation, an adjustable system supporting said shaft and effecting means, said adjustable system being connected for rotation to an adjusted position and being supported by said base structure, a pulley of fixed effective diameter in spaced parallel relationship to said V pulley, an endless V belt trained about and between effective diameters of said V pulley and said fixed diameter pulley, said adjustable system providing means for moving said shaft over a curved path to change the location thereof to conform to a desired location of said fixed diameter pulley independently of the plane of base setting and without upsetting the effecting means.

5. In combination, a V pulley having pair of cooperating sections forming, by axial movement with respect to one another, a V pulley of variable effective diameter, means to effect axial movement with respect to one another of said pulley sections, a shaft supporting said V pulley for rotation, means supporting said shaft for rotation about an axis parallel to but spaced from said shaft, positive means connected to said shaft support for moving said shaft transversely, and pivot means supporting said shaft for rotative movement about said pivot to permit moving said shaft and said positive means to a desired position.

6. In combination, a pulley of fixed effective diameter, a V pulley having a pair of cooperating sections forming, by axial movement with respect to one another, a V pulley of variable effective diameter, a shaft supporting said V pulley, means for rotating said V pulley, an endless V belt trained about and between effective diameters of said pulley and said V pulley, means to effect axial movement with respect to one another of said V pulley sections and cooperating means effecting movement of said shaft transversely, a support, a pivot element, said means together with said cooperating and rotating means being collectively joined to said pivot element and forming a unit, said unit together with said pivot element being supportably joined to said support, said unit being selectively adjustable about said pivot element and said support.

7. In combination, a V pulley having pair of cooperating sections forming, by axial movement with respect to one another, a V pulley of variable effective diameter, means to effect axial movement with respect to one another of said pulley sections, a shaft supporting said V pulley for rotation, means supporting said shaft for rotation about an axis parallel to but spaced from said shaft, positive means connected to said shaft support for moving said shaft transversely about said axis, and pivot means supporting said shaft for rotation about said pivot to permit moving said shaft and said positive means to a desired position, said pivot means having means to move said shaft transversely.

8. In combination, a V pulley having pair of cooperating sections forming, by axial movement with respect to one another, a V pulley of variable effective diameter, means to effect axial movement with respect to one another of said pulley sections, a shaft supporting said V pulley for rotation, means supporting said shaft for rotation to a selected position about an axis parallel to but spaced from said shaft, said shaft support means having means for moving in transverse direction said shaft support by positive means connected to said shaft support, said transverse moving means and said axial movement means being correlated to effect simultaneously the two movements upon actuation of said positive means.

9. In combination, a first pulley of fixed effective diameter supported for rotation, a first pivot means spaced from said first pulley forming pivoted support for said support, a second pulley of adjustable effective diameter, a shaft supporting said second pulley for rotation in spaced adjustable relationship parallel to said first pulley, a second pivot means spaced from said second pulley forming a pivoted support for supporting said shaft, an endless V belt trained about and between the effective diameters of said first and said second pulley, said second pulley including an adjustable portion to vary the drive ratio between said pulleys cooperating with means connected to one of said pivoted supports to change the distance between said pulleys, and further movement about pivot means of other said pivoted support effecting a change in the distance between said pulleys being controllable by said V belt.

10. In combination, a first pulley of fixed effective diameter supported for rotation, a first pivot means spaced from but parallel to said first pulley forming a pivoted support for said first pulley, a second pulley of adjustable effective diameter, a shaft supporting said second pulley for rotation in spaced adjustable relationship parallel to said first pulley, a second pivot means spaced from but parallel to said second pulley forming a pivoted support for supporting said shaft, an endless V belt trained about and between the effective diameters of said first and said second pulley, said second pulley including an adjustable portion to vary the drive ration between said pulleys and cooperating with means effecting transverse movement to change the center distance between said pulleys while maintaining a condition of drive contact between the drive faces of said V belt with said pulley effective diameters throughout the range of the changing drive ratio and said transverse movement effected about the axis of said pivot means.

11. In a speed change unit, a first shaft, a first gear on said first shaft, a second shaft, a second gear on said second shaft in mesh with said first gear, a V belt pulley on said second shaft, means supporting said second shaft for radial movement about said first shaft, means to effect said radial movement connected to said support means, said pulley including sections movable with respect to one another to vary the effective diameter of the said pulley, and means for moving said sections with respect to one another upon said radial movement of said second shaft.

12. In combination, a first pulley of fixed effective diameter supported for rotation, a second pulley of adjustable effective diameter, a first shaft supporting said second pulley in adjustable spaced parallel relationship to said first pulley, an endless V belt trained about said first and said second pulley effective diameters, said second pulley including adjustable pulley sections movable to vary the drive ratio between said pulleys, a second shaft supported for rotation, drive means interconnecting said first and said second shaft, means supporting said first shaft for rotation about axis of said second shaft, means for moving said first shaft support in a direction toward or away from said first pulley to simultaneously vary the effective diameter of said second pulley, said moving means compensating for the effect of rotation about said second shaft by said interconnecting drive means and said means supporting said first shaft.

13. In combination, a first pulley of fixed effective diameter supported for rotation, a second pulley of adjustable effective diameter together with a rotative member in adjustable spaced relationship parallel to said first pulley, and endless V belt trained about and between said first and said second pulley effective diameters, said second pulley including adjustable pulley sections movable with respect to each other to vary the drive ratio betwen said pulleys, a first shaft supporting said second pulley with said rotative member for rotation, another shaft supported for rotation and having mounted thereon rotative member in mesh with the rotative member mounted on said first shaft, means supporting said first shaft for rotation about the axis of said another shaft, and positive means for moving said first shaft support towards or away from said first pulley and simultaneously vary the effective diameter of said second pulley.

14. In a device of the character described, a pulley of fixed effective diameter supported for rotation, a V pulley having a pair of cooperating sections forming by axial movement with respect to one another a V pulley of variable effective diameter, means to effect said axial movement, an endless V belt trained about and between the effective diameters of said pulley and said V pulley, a shaft supporting said V pulley for rotation, means supporting said shaft support for rotation about a pivot, said pivot being parallel to but spaced from said shaft, and means for moving said shaft toward or away from said first pulley about said pivot, said means moving said shaft and said axial movement means cooperatively and simultaneously to effect a change in the drive ratio between said pulleys, said shaft together with said pivot being supported by a speed change unit including a portion adapted to be secured to a fixed foundation.

15. In a speed change device, a first shaft supported in a fixed position for rotation, a first pulley on said first shaft, said first pulley being of a fixed diameter, a second shaft positioned parallel to the first shaft and in driving relationship thereto, bearing means supporting said second shaft for rotation, means supporting said bearing means for selective movement toward and away from said first shaft whereby the axial distance between said shafts can be varied, a cam mounted on said bearing support means, a second pulley on said second shaft having a pair of pulley sections having opposed inclined faces and forming by relative axial adjustment a second pulley of variable effective pulley diameter, a continuous belt of substantially constant length trained about said pulleys, means for moving said pulley sections toward and away from each other to vary the effective diameter of said second pulley and including a member engaged with said cam, and means for simultaneously moving said pulley section moving means and said bearing support means to move said second shaft with respect to the first shaft and said member over said cam, said cam having a face thereon cooperatively engaged by said member and adapted to move said member to adjust said pulley sections with respect to one another at a rate such that a constant belt path length is maintained about said first pulley and said second pulley throughout the range of adjustment of the second pulley and variation in the axial distance between said shafts.

16. In a speed change device, a first shaft supported in a fixed position for rotation, a first pulley on said first shaft, said first pulley being of a fixed diameter, a second shaft relationship thereto, said second shaft including a hollow end thereon, bearing means supporting said second shaft for rotation, means supporting said bearing means for selective movement toward and away from said first shaft whereby the axial distance between said shafts can be varied, a cam mounted on said bearing support means, a second pulley on said second shaft having a pair of pulley sections having opposed inclined faces and forming by relative axial adjustment a second pulley of variable effective pulley diameter, a continuous belt of substantially constant length trained about said pulleys, means for moving said pulley sections toward and away from each other to vary the effective diameter of said second pulley, said moving means including a pair of members mounted in said second shaft hollow end and respectively engaged with one of said pulley sections to move the same with respect to the other, means for simultaneously moving said pair of members including a member engaged with said cam, and means for simultaneously moving said pulley section moving means and said bearing support means to move said second shaft with respect to the first shaft and said member over said cam, said cam having a face thereon cooperatively engaged by said member and adapted to move said member to adjust said pulley sections with respect to one another at a rate such that a constant belt path length is maintained about said first pulley and said second pulley throughout the range of adjustment of the second pulley and variation in the axial distance between said shafts.

17. In a speed change device as in claim 15 wherein the second shaft moving means is effective to move the second shaft in a straight line path toward and away from the first shaft.

18. In a speed change device as in claim 15 wherein the second shaft is movable pivotally about a pivot support therefor over an arcuate path toward and away from the first shaft.

JOHN D. RIESER.

REFERENCES CITED

The following references are of record in the file of this patent:

UNITED STATES PATENTS

| Number | Name | Date |
|---|---|---|
| 2,180,678 | Heyer | Nov. 21, 1939 |
| 2,180,687 | McElroy | Nov. 21, 1939 |
| 2,189,288 | Heyer | Feb. 6, 1940 |
| 2,200,101 | Schmitter | May 7, 1940 |
| 2,203,149 | Hoover | June 4, 1940 |
| 2,209,484 | Tautz | July 30, 1940 |
| 2,245,667 | Heyer | June 17, 1941 |
| 2,247,552 | Heyer | July 1, 1941 |
| 2,258,776 | L'Hommedieu | Oct. 14, 1941 |
| 2,259,567 | Johnson | Oct. 21, 1941 |
| 2,341,786 | Johnson | Feb. 15, 1944 |

FOREIGN PATENTS

| Number | Country | Date |
|---|---|---|
| 415,290 | Germany | June 17, 1925 |